(12) United States Patent
Masuda et al.

(10) Patent No.: US 11,594,379 B2
(45) Date of Patent: Feb. 28, 2023

(54) ELECTRONIC DEVICE

(71) Applicant: TDK CORPORATION, Tokyo (JP)

(72) Inventors: Akihiro Masuda, Tokyo (JP); Shinya Ito, Tokyo (JP); Norihisa Ando, Tokyo (JP); Tomoyuki Sasaki, Tokyo (JP); Shinya Onodera, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/494,538

(22) Filed: Oct. 5, 2021

(65) Prior Publication Data
US 2022/0157533 A1      May 19, 2022

(30) Foreign Application Priority Data

Nov. 16, 2020   (JP) .............................. JP2020-190458
Dec. 25, 2020   (JP) .............................. JP2020-216568

(51) Int. Cl.
| | |
|---|---|
| *H01G 4/38* | (2006.01) |
| *H01G 4/224* | (2006.01) |
| *H01G 4/30* | (2006.01) |
| *H01G 2/08* | (2006.01) |
| *H01G 2/06* | (2006.01) |
| *H01G 4/12* | (2006.01) |

(52) U.S. Cl.
CPC ............... *H01G 4/38* (2013.01); *H01G 2/065* (2013.01); *H01G 2/08* (2013.01); *H01G 4/224* (2013.01); *H01G 4/30* (2013.01); *H01G 4/12* (2013.01)

(58) Field of Classification Search
CPC .......... H01G 2/08; H01G 4/232; H01G 4/224; H01G 4/38
See application file for complete search history.

(56) References Cited

U.S. PATENT DOCUMENTS

| | | | |
|---|---|---|---|
| 2003/0231477 A1* | 12/2003 | Vierow ................... | H01G 4/38 361/801 |
| 2017/0154729 A1* | 6/2017 | Lee ........................ | H01G 4/012 |
| 2019/0080845 A1* | 3/2019 | Onodera .............. | H05K 1/0271 |
| 2019/0096576 A1* | 3/2019 | Onodera ............... | H01G 4/232 |

FOREIGN PATENT DOCUMENTS

JP          H11-08158 A      1/1999

* cited by examiner

*Primary Examiner* — Eric W Thomas
(74) *Attorney, Agent, or Firm* — Oliff PLC

(57) ABSTRACT

An electronic device includes a plurality of chip components and an insulating case. The chip components are arranged in a first direction. The case includes a plate portion, a first protrusion portion, and a second protrusion portion. The plate portion faces first side surfaces of the chip components. The first protrusion portion is formed along a plate-portion first side of the plate portion and protrudes from the plate portion toward a downside perpendicular to the first direction. The second protrusion portion is formed to the first protrusion portion in a second direction and protrudes from the plate portion toward the downside. A protrusion length of the first protrusion portion and the second protrusion portion from the plate portion toward the downside is smaller than a protrusion length of the chip component included in the chip components from the plate portion toward the downside.

22 Claims, 25 Drawing Sheets

ELECTRONIC DEVICE

BACKGROUND OF THE INVENTION

The present invention relates to an electronic component including a plurality of chip components.

An electronic device in which a plurality of chip components, such as chip capacitors, is integrated using a board is proposed (see Patent Document 1). In such an electronic device, the plurality of chip components can be mounted altogether on the board, and an advantageous effect for simplification and speeding up of mounting process is thereby exhibited as compared with ones in which chip components are mounted individually.

In conventional electronic devices in which a plurality of chip components is integrated with a case or so, however, the plurality of chip components needs to be positioned to the case and assembled one by one at the time of assembling, and there is a problem that it takes time and effort to position the chip components and the case and to store the chip components into the case.

Patent Document 1: JPH118158 (A)

BRIEF SUMMARY OF INVENTION

The present invention has been achieved under such circumstances. It is an object of the invention to provide an electronic device capable of assembling a plurality of chip components by efficiently positioning them to a case.

To achieve the above object, an electronic device according to the present invention comprises:
  a plurality of chip components arranged in a first direction; and
  an insulating case including:
  a plate portion facing first side surfaces of the plurality of chip components;
  a first protrusion portion formed along a plate-portion first side of the plate portion parallel to the first direction and protruding from the plate portion toward a downside perpendicular to the first direction; and
  a second protrusion portion formed to the first protrusion portion in a second direction perpendicular to the first direction and the downside and protruding from the plate portion toward the downside,
  wherein a protrusion length of the first protrusion portion and the second protrusion portion from the plate portion toward the downside is smaller than a protrusion length of the chip component included in the plurality of chip components from the plate portion toward the downside.

In the electronic device according to the present invention, the plurality of chip components can easily be positioned to the insulating case in the vertical direction and the second direction by disposing the plurality of chip components while bringing them into contact with the plate portion and the first protrusion portion. The positioning in the first direction can be carried out by contact with the second protrusion portion or with the adjacent chip components. Thus, such an electronic device can be assembled by easily and efficiently positioning the plurality of chip components to the case. Since the protrusion length of the first protrusion portion and the second protrusion portion is smaller than that of the chip component, it is possible to prevent a problem that the case hinders the joint between the plurality of chip components assembled to the case and the mounting board. The insulating case has a thermal conductivity higher than that of the air. Thus, compared to chip components mounted simply densely, the electronic device has excellent heat dissipation characteristics.

For example, terminal electrodes of at least two chip components included in the plurality of chip components may be contacted with each other.

In such an electronic device, two or more chip components are connected electrically via the terminal electrodes, and it is thereby possible to easily form an electronic device including a circuit in which chip components are connected in series or in parallel.

For example, the protrusion length of the first protrusion portion and the second protrusion portion from the plate portion toward the downside may be ½ or less of the protrusion length of the plurality of chip components from the plate portion toward the downside.

In such an electronic device, even if the terminal electrodes are partly formed on the end surfaces of the plurality of chip components perpendicular to the mounting surface, it is possible to prevent a problem that the first and second protrusion portions hinder the formation of solder fillet between the mounting surface and the terminal electrodes.

For example, second side surfaces of the plurality of chip components directed opposite to the first side surfaces may be arranged along a virtual plane substantially parallel to the plate portion, and terminal electrodes included in the plurality of chip components may be at least partly formed on the second side surfaces.

Such an electronic device can easily be mounted on, for example, the mounting board with the virtual plane as a mounting surface. In addition, when such an electronic device is transported to the mounting board with a mounting machine, a nozzle of the mounting machine holds the insulating case to achieve a stable transportation.

For example, the electronic device according to the present invention may further comprise a heat dissipation plate including a heat transmission portion disposed so as to face terminal electrodes included in the plurality of chip components and configured to transmit heat from the plurality of chip components and having a thermal conductivity higher than that of the insulating case.

The electronic device including such a heat dissipation plate efficiently dissipates the heat generated in the chip components and can prevent the temperature rise of the electronic device.

For example, the heat dissipation plate may include a top-surface heat dissipation portion disposed on a plate-portion top surface directed opposite to a plate-portion bottom surface facing the chip components in the plate portion.

The electronic device including such a heat dissipation plate can efficiently dissipate the heat of the chip components from the top-surface heat dissipation portion and efficiently prevent the temperature rise of the electronic device.

For example, the heat dissipation plate may be adhered to the plate-portion top surface, and the first side surfaces of the plurality of chip components may be adhered to the plate-portion bottom surface.

In such an electronic device, the heat dissipation plate, the chip components, and the insulating case are integrated via the plate portion of the insulating case, and the assembleability is good.

For example, the plate portion may have a substantially rectangular shape when viewed from the downside, the chip component included in the plurality of chip components may include a pair of terminal electrodes, and the heat dissipation plate of the heat transmission portion may face the terminal electrode closer to a plate-portion third side parallel to the plate-portion first side than the plate-portion first side among the pair of terminal electrodes.

When the heat transmission portion is disposed so as to face the terminal electrode close to the plate-portion third side among the pair of terminal electrodes, a large area of the heat transmission portion can face the terminal electrode without interference with the first protrusion portion. Thus, such an electronic device has good heat dissipation characteristics.

For example, the heat dissipation plate may include a cylindrical heat dissipation portion formed in the first direction.

The heat dissipation plate including the cylindrical heat dissipation portion can have a large contact area with the outside air. Thus, such an electronic device has good heat dissipation characteristics.

For example, the plate portion may have a substantially rectangular shape when viewed from the downside, the second protrusion portion may be disposed along a plate-portion second side perpendicular to the plate-portion first side of the plate portion, and non-protrusion edge portions with no protrusion may be formed on a plate-portion third side parallel to the plate-portion first side and a plate-portion fourth side parallel to the plate-portion second side in the plate portion.

When the first protrusion portion and the second protrusion portion are formed on the plate-portion first side and the plate-portion second side and the non-protrusion edge portions are formed on the plate-portion third side and the plate-portion fourth side, the plurality of chip components can easily and efficiently be positioned to such an insulating case. In addition, even if the plurality of chip components has dimensional variations, the plurality of chip components can be positioned easily to the insulating case and assembled. Thus, the chip components can easily be assembled to the insulating case, and such an electronic device is excellent in productivity.

For example, the plate portion may have a substantially rectangular shape when viewed from the downside, and the plurality of chip components may partly protrude outside the plate portion from a plate-portion third side parallel to the plate-portion first side of the plate portion.

Such an electronic device can be downsized with a smaller plate portion and have a smaller mounting area.

For example, the insulating case may be made of resin.

The insulating case is made of any insulating material and can be made of, for example, resin. When the insulating case is made of resin, the stress generated in the electronic device after mounting is reduced effectively, and the electronic device can be prevented from being damaged. In addition, the insulating case made of resin has a thermal conductivity higher than that of the air, and such an electronic device thereby has good heat dissipation characteristics.

For example, terminal electrodes of at least one chip component included in the plurality of chip components and at least another adjacent chip component may be separated from each other.

When the plurality of chip components is disposed separately, the heat generated in the chip components is dissipated easily. In addition, when the terminal electrodes are separated from each other, the chip components are connected electrically on the mounting board side, and various electrical circuits can be formed.

A recess or a groove is formed on a plate-portion bottom surface of the plate portion facing the chip components.

When such a recess or groove is formed, variations in the shape of an adhesive cured portion joining between the chip components and the plate portion are prevented, and the joint strength between the chip components and the plate portion can be controlled appropriately.

For example, all of the chip components included in the plurality of chip components may be contacted with the first protrusion portion, and only one chip component located at one end in the first direction among the chip components included in the plurality of chip components may be contacted with the second protrusion portion.

In such an electronic device, the plurality of chip components can be positioned to the insulating case along the first protrusion portion altogether or sequentially from one end, and an efficient assembling can be achieved.

For example, the second protrusion portion may be formed along a plate-portion second side perpendicular to the plate-portion first side of the plate portion, and the first protrusion portion and the second protrusion portion may be connected substantially perpendicularly to form an L-shaped protrusion.

When the first protrusion portion and the second protrusion portion form an L-shaped protrusion, the plurality of chip components can be positioned easily and efficiently, and the first protrusion portion and the second protrusion portion can be strengthened. Thus, such an electronic device has good assembleability and contributes to the entire downsizing of the insulating case and the electronic device.

DETAILED DESCRIPTION OF INVENTION

Hereinafter, the present invention is explained based on the embodiments shown in the figures.

First Embodiment

Figure 1:
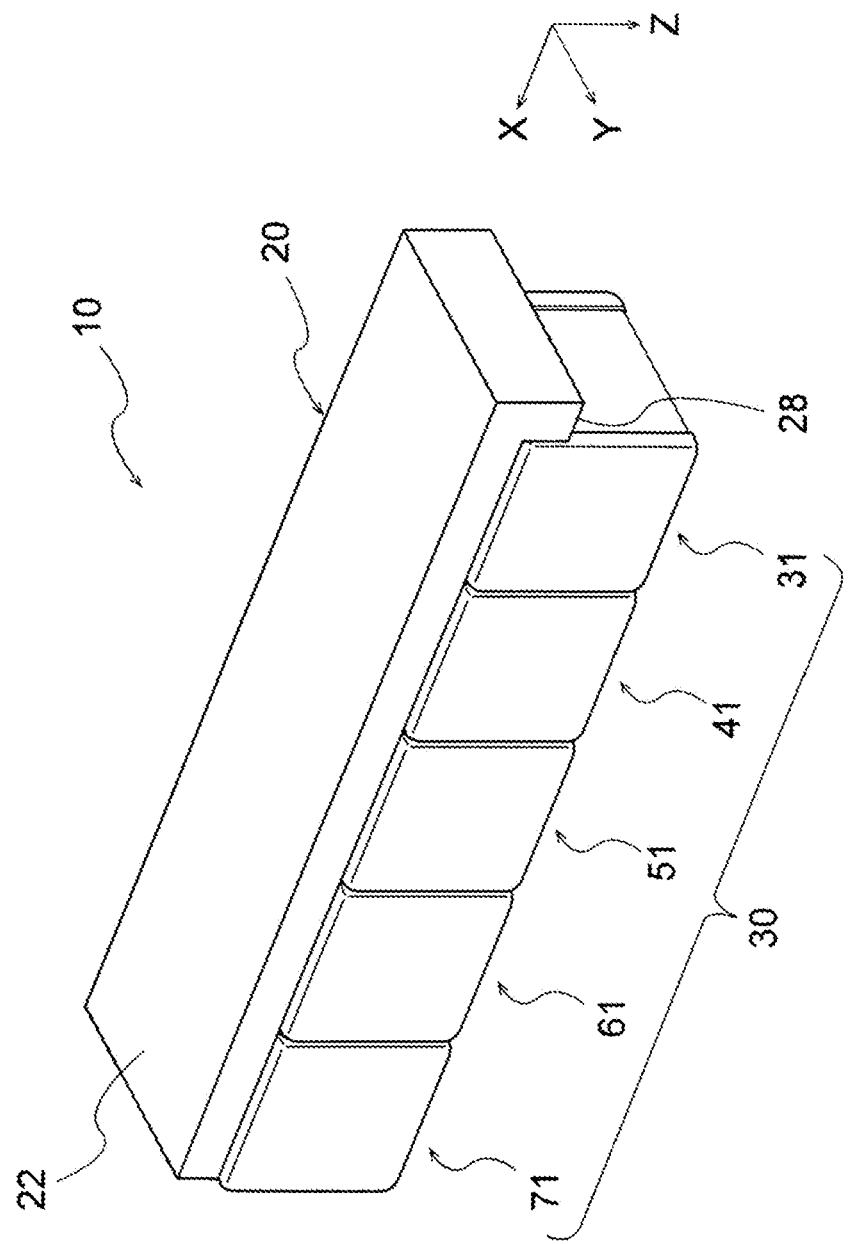
FIG. 1 is a schematic perspective view of an electronic device according to First Embodiment of the present invention from diagonally above.

FIG. 1 is a schematic perspective view of an electronic device 10 according to First Embodiment of the present invention from diagonally above. The electronic device 10 includes a plurality of chip components 30 and an insulating case 20 for fixing the plurality of chip components 30.

In the description of the electronic device 10, as shown in FIG. 1, the X-axis direction is the first direction, which is a direction where the chip components 30 are arranged, the Z-axis direction is a direction from the insulating case 20 disposed on the top of the electronic device 10 to a mounting surface disposed below, and the Y-axis direction is the second direction perpendicular to the X-axis direction and the Z-axis direction. The first direction and the second direction are directions substantially parallel to the mounting surface of the electronic device 10. In the description of the electronic device 10, the first and second directions may be referred to as the horizontal direction.

As shown in FIG. 1, the plurality of chip components 30 in the electronic device 10 consist of five chip components 31, 41, 51, 61, and 71. The plurality of chip components 30 consisting of the five chip components 31, 41, 51, 61, and 71 is disposed in the X-axis direction (first direction).

The number of chip components 31, 41, 51, 61, and 71 included in the plurality of chip components 30 is not limited to only five shown in FIG. 1, and the electronic device 10 can include any number (two or more) of chip components 31, 41, 51, 61, and 71. The chip components 31, 41, 51, 61, and 71 have substantially the same shape, size, and structure. Thus, for the chip components 31, 41, 51, 61, and 71, the chip component 31 is mainly described, and the other chip components 41, 51, 61, and 71 are not described. However, the chip components 31, 41, 51, 61, and 71 included in the plurality of chip components 30 are not limited to the same one as shown in FIG. 1 and may have different shapes and sizes.

Figure 2:
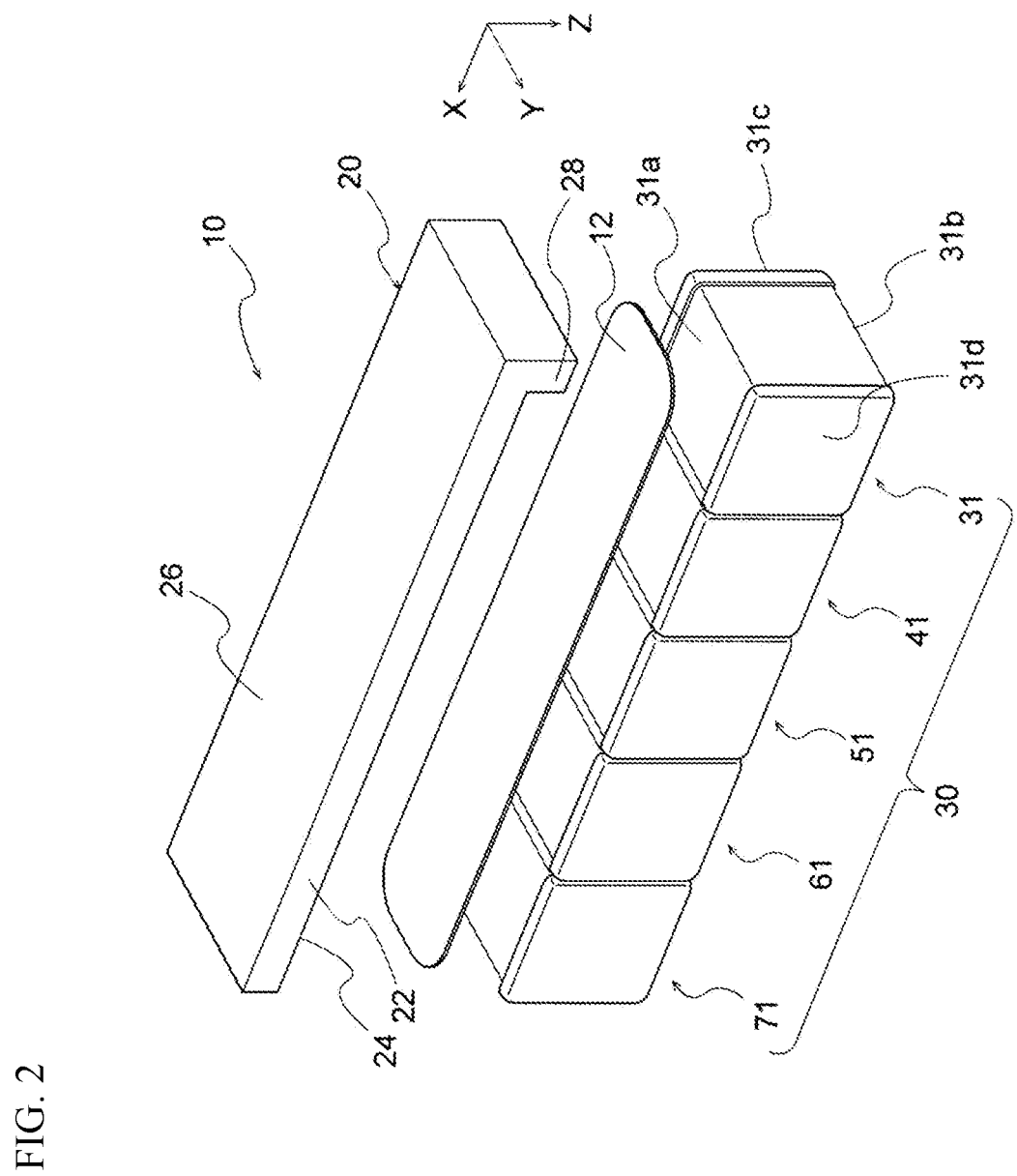
FIG. 2 is an exploded perspective view of the electronic device shown in FIG. 1.

FIG. 2 is an exploded perspective view of the electronic device 10 shown in FIG. 1. As shown in FIG. 2, the chip component 31 has a substantially rectangular parallelepiped outer shape and is disposed so that a first side surface 31a directed upward (negative side in the Z-axis) faces a plate-portion bottom surface 24 of the insulating case 20. The chip component 31 included in the electronic device 10 is a chip capacitor, but the chip components 31, 41, 51, 61, and 71 are not limited to chip capacitors and may be chip components other than chip capacitors, such as chip inductors and chip varistors.

Figure 4:
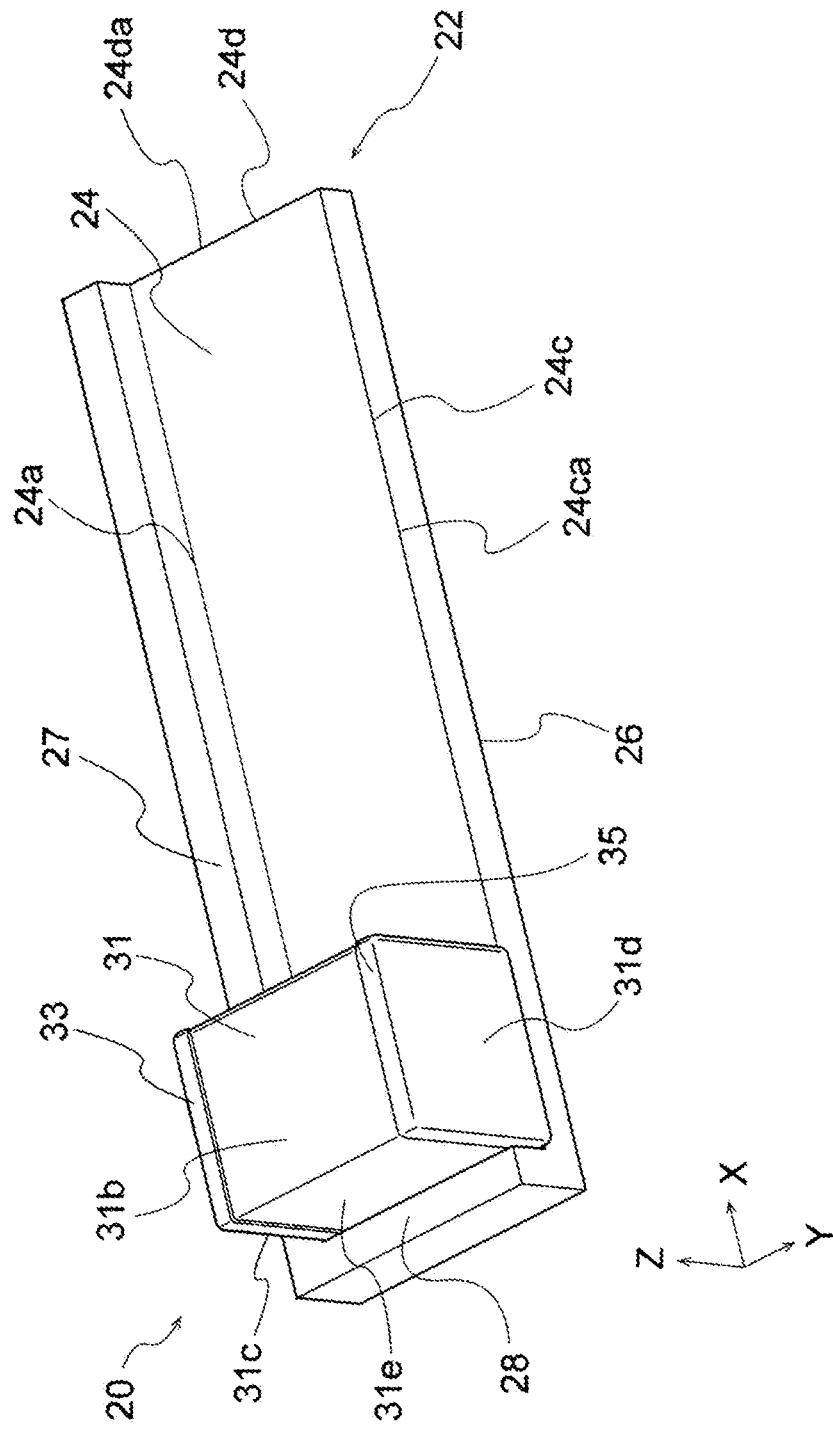
FIG. 4 is a conceptual view illustrating an assembly process of the electronic device shown in FIG. 1.
Figure 5:
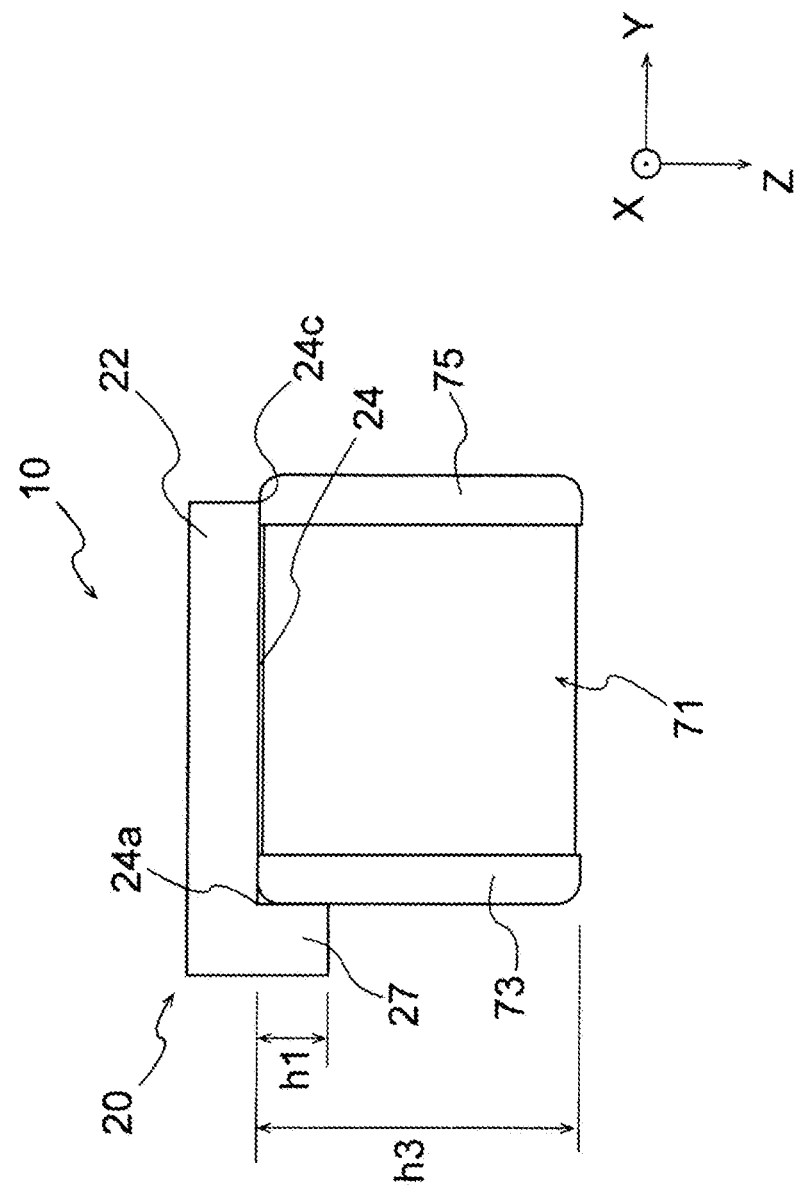
FIG. 5 is a side view of the electronic device shown in FIG. 1 when viewed from a first direction.

FIG. 4 is a conceptual view illustrating a step of a manufacturing process of the electronic device 10 and illustrates a state in which only one chip component 31 is disposed on the insulating case 20. As shown in FIG. 5, the chip component 31 includes a pair of terminal electrodes 33 and 35. Among the surfaces of the chip component 31, the terminal electrode 33 (35) is formed on the entire end surface 31c (31d) perpendicular to the Y-axis direction (second direction). The terminal electrode 33 (35) ranges other surfaces next to the first end surface 31c and the second end surface 31d. At least a part of the terminal electrode 33 (35) is also formed on a second side surface 31b directed downward, which is the opposite side to the first side surface 31a.

Dielectric layers and internal electrode layers are alternately laminated inside the chip component 31. The material of the dielectric layers is not limited and is, for example, a dielectric material such as calcium titanate, strontium titanate, barium titanate, and mixtures thereof. Each of the dielectric layers has any thickness, but normally has a thickness of 1 µm to hundreds of µm. In the present embodiment, preferably, each of the dielectric layers has 1.0-5.0 µm.

The internal electrode layers contain a conductor material. The conductor material contained in the internal electrode layers is not limited, but can be a relatively inexpensive base metal when the constituent material of the dielectric layers has reduction resistance. Preferably, the base metal used for the internal electrode layers is Ni or a Ni alloy. The Ni alloy is preferably an alloy of Ni with one or more elements selected from Mn, Cr, Co, and Al, and the Ni content in the alloy is preferably 95% by weight or more. The Ni or Ni alloy may contain various trace components, such as P, in an amount of about 0.1% by weight or less. The internal electrode layers may be formed using a commercially available electrode paste. The thickness of the internal electrode layers may be appropriately determined according to the application and the like. The internal electrode layers may be made of a conductive material other than metal.

The internal electrode layers laminated inside the chip component 31 are divided into those connected to one terminal electrode 33 and those connected to the other terminal electrode 35. The potential difference applied to one terminal electrode 33 and the other terminal electrode 35 is applied to the dielectric layers of the chip component 31 via the internal electrode layers.

The materials of the terminal electrodes 33 and 35 are not limited and can normally be copper, copper alloy, nickel, nickel alloy, or the like, but can also be silver, an alloy of silver and palladium, or the like. The terminal electrode 33

(35) has any thickness, but normally has a thickness of about 10-50 μm. At least one metal film selected from Ni, Cu, Sn, etc. may be formed on the surfaces of the terminal electrodes 33 and 35.

Figure 3:
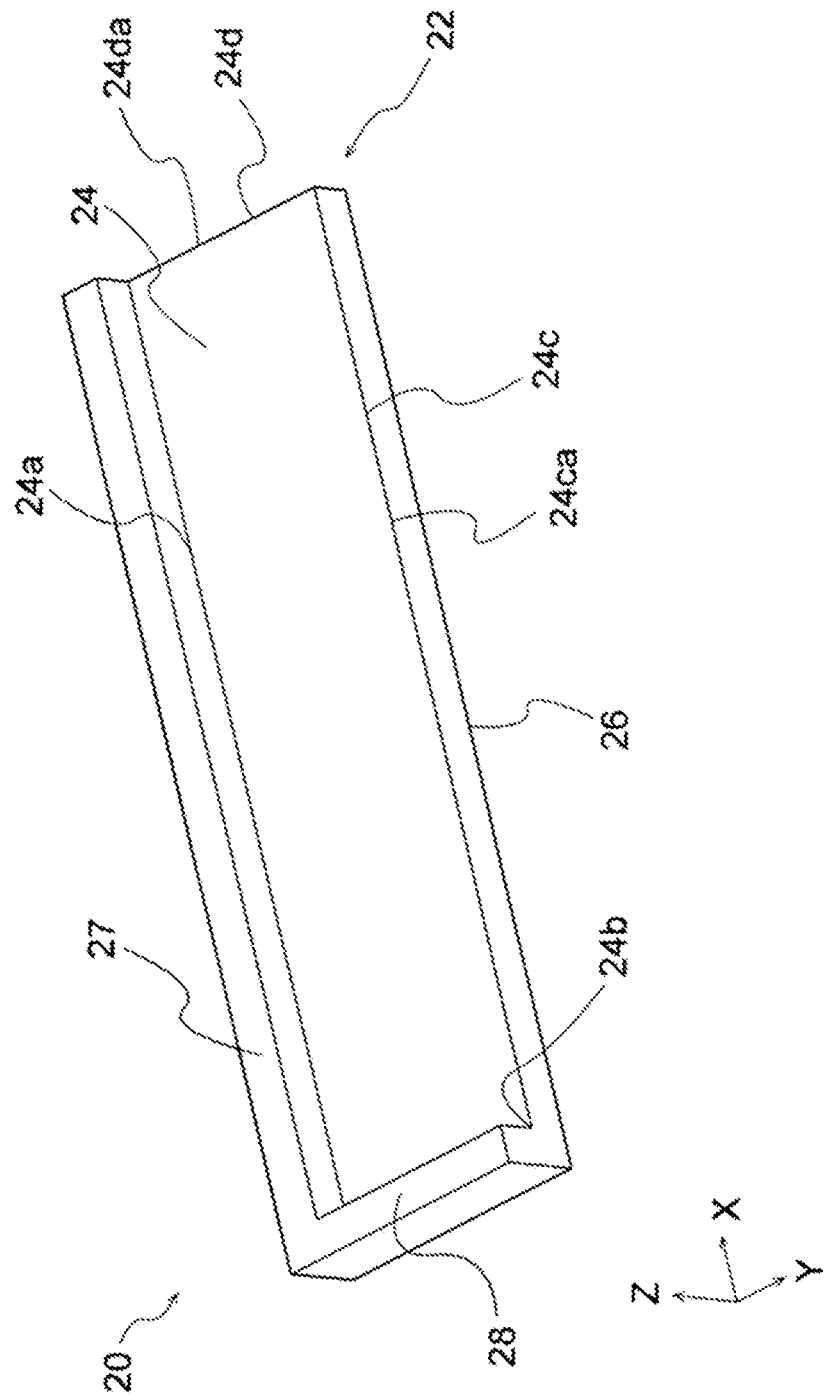
FIG. 3 is a schematic perspective view of an insulating case included in the electronic device shown in FIG. 1 when viewed from diagonally below.

FIG. 3 is a schematic perspective view of only the insulating case 20 of the electronic device 10 when viewed from diagonally below. As shown in FIG. 3, the insulating case 20 includes a plate portion 22, a first protrusion portion 27, and a second protrusion portion 28. As shown in FIG. 2, the plate portion 22 has a substantially rectangular flat plate outer shape and is disposed so as to face the first side surface 31a of the plurality of chip components 30.

As shown in FIG. 3, the plate portion 22 has a substantially rectangular outer shape when viewed from the positive side in the Z-axis (downside). As shown in FIG. 2, the first side surface 31a of the plurality of chip components 30 is fixed to the plate-portion bottom surface 24 of the insulating case 20 directed to the downside via an adhesive cured portion 12 (an adhesive is cured).

As shown in FIG. 3, the first protrusion portion 27 is formed along a plate-portion first side 24a of the plate portion 22 parallel to the first direction. The first protrusion portion 27 protrudes from the plate portion 22 toward the downside perpendicular to the first direction. The first protrusion portion 27 has a square columnar outer shape extending in the X-axis direction (first direction), but may have any other shape, such as triangular column shape. Unlike the first protrusion portion 27 continuing in the X-axis direction as shown in FIG. 3, the first protrusion portion 27 may be formed of a protrusion formed intermittently in the first direction.

As shown in FIG. 3, the second protrusion portion 28 is formed to the first protrusion portion 27 in the second direction (Y-axis direction) perpendicular to the first direction and the downside and protrudes from the plate portion 22 toward the downside. The second protrusion portion 28 is formed along a plate-portion second side 24b perpendicular to the plate-portion first side 24a of the plate portion 22.

The second protrusion portion 28 has a square columnar outer shape extending in the Y-axis direction (second direction), but may have any other outer shape, such as triangular column shape. Unlike the second protrusion portion 28 continuing in the second direction as shown in FIG. 3, the second protrusion portion 28 may be an isolated protrusion formed separately from the first protrusion portion 27 to the positive side in the Y-axis.

As shown in FIG. 3, where the insulating case 20 is viewed from diagonally below, the first protrusion portion 27 and the second protrusion portion 28 are connected substantially perpendicularly at the corner of the plate portion 22 connecting the plate-portion first side 24a and the plate-portion second side 24b to form an L-shaped protrusion.

As shown in FIG. 3, the plate-portion first side 24a of the plate-portion bottom surface 24 is provided with the first protrusion portion 27, and the plate-portion second side 24b of the plate-portion bottom surface 24 is provided with the second protrusion portion 28, but the other two sides of the plate-portion bottom surface 24 are provided with no protrusion portion.

That is, as shown in FIG. 3, non-protrusion edge portions 24ca and 24da with no protrusions are formed in a plate-portion third side 24c parallel to the plate-portion first side 24a and a plate-portion fourth side 24d parallel to the plate-portion second side 24b in the plate portion 22. Thus, the plate-portion third side 24c and the plate-portion fourth side 24d form an outer periphery of the insulating case 20.

As shown in FIG. 4, the first end surface 31c of the chip component 31 directed to the negative side in the Y-axis contacts with the first protrusion portion 27, and a third side surface 31e of the chip component 31 directed to the negative side in the X-axis contacts with the second protrusion portion 28. As with the chip component 31, the first end surfaces of the chip components 41, 51, 61, and 71 shown in FIG. 1 and FIG. 2 directed to the negative side in the Y-axis contact with the first protrusion portion 27. Unlike the chip component 31, the third side surfaces of the chip components 41, 51, 61, and 71 directed to the negative side in the X-axis do not contact with the second protrusion portion 28, but contact with the other chip components 31, 41, 51, and 61 adjacent to the negative side in the X-axis.

That is, all of the chip components 31, 41, 51, 61, and 71 included in the plurality of chip components 30 shown in FIG. 1 are contacted with the first protrusion portion 27, but only one chip component 31 located at one end in the first direction (the end on the negative side in the X-axis) among the chip components 31, 41, 51, 61, and 71 included in the plurality of chip components 30 contacts with the second protrusion portion 28. As mentioned below in a method of manufacturing the electronic device 10, the chip components 31, 41, 51, 61, and 71 are positioned to the insulating case 20 by the first protrusion portion 27, the plate-portion bottom surface 24, the second protrusion portion 28, and the other adjacent chip components 31, 41, 51, and 61.

Figure 6:
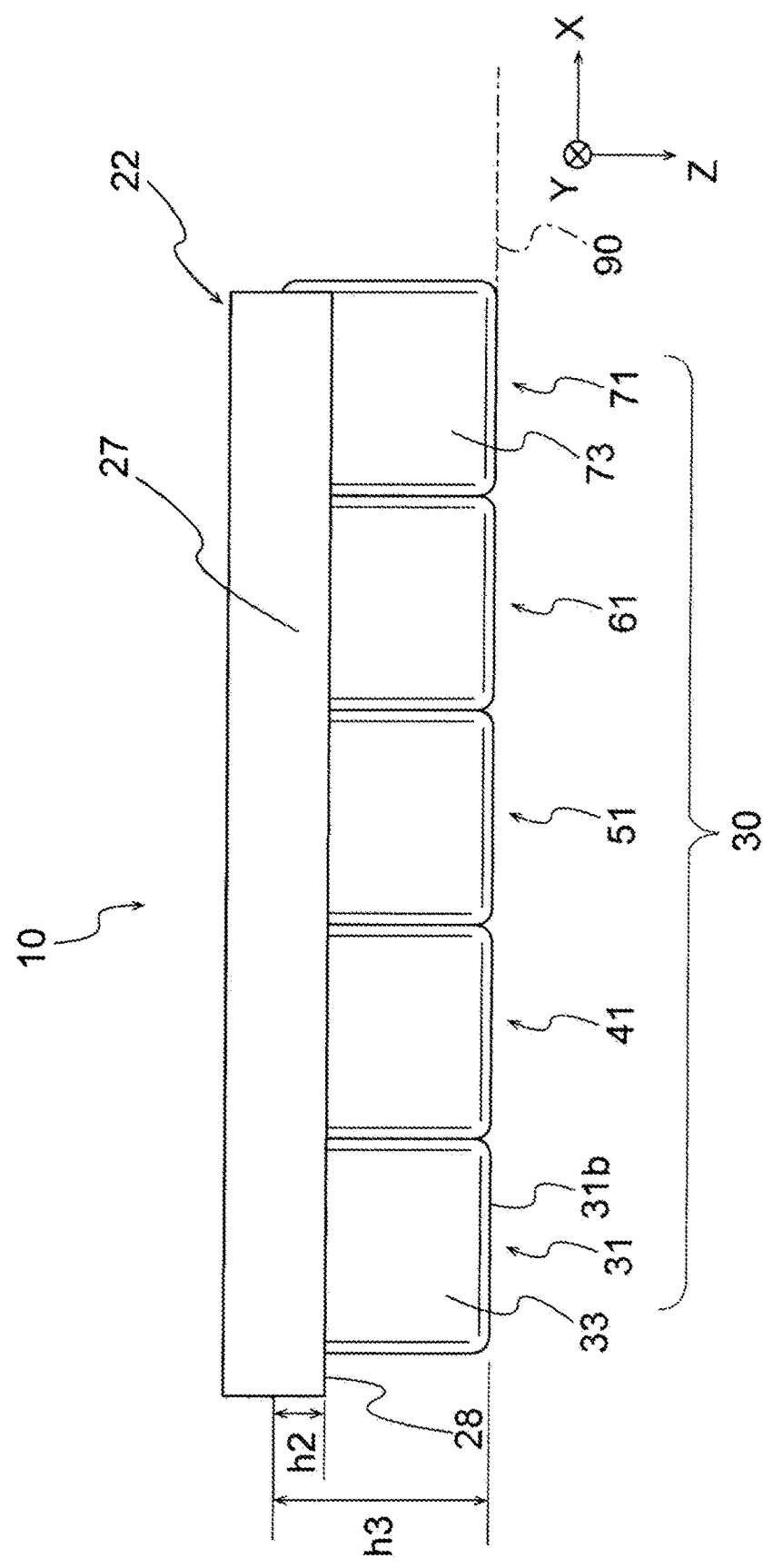
FIG. 6 is a side view of the electronic device shown in FIG. 1 when viewed from a second direction.

FIG. 5 is a side view of the electronic device 10 shown in FIG. 1 when viewed from the positive side in the X-axis, and FIG. 6 is a back view of the electronic device 10 when viewed from the negative side in the Y-axis. As shown in FIG. 5 and FIG. 6, both of a protrusion length h1 of the first protrusion portion 27 from the plate portion 22 toward the downside and a protrusion length h2 of the second protrusion portion 28 from the plate portion 22 toward the downside are smaller than a protrusion length h3 of the chip components 31, 41, 51, 61, and 71 included in the plurality of chip components 30 from the plate portion 22 toward the downside.

Figure 7:
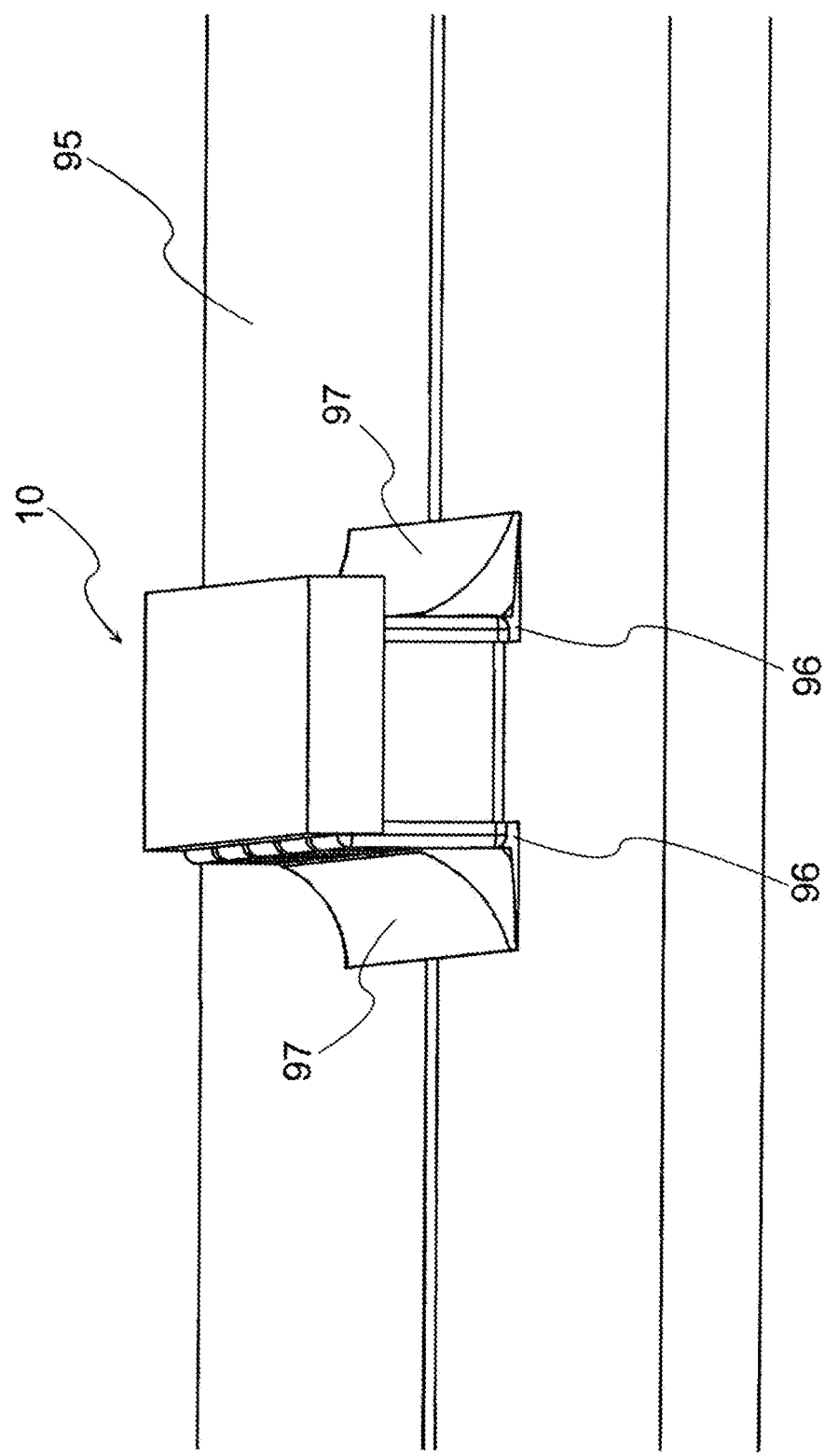
FIG. 7 is a schematic perspective view illustrating a state in which the electronic device shown in FIG. 1 is mounted on a mounting board.
Figure 8:
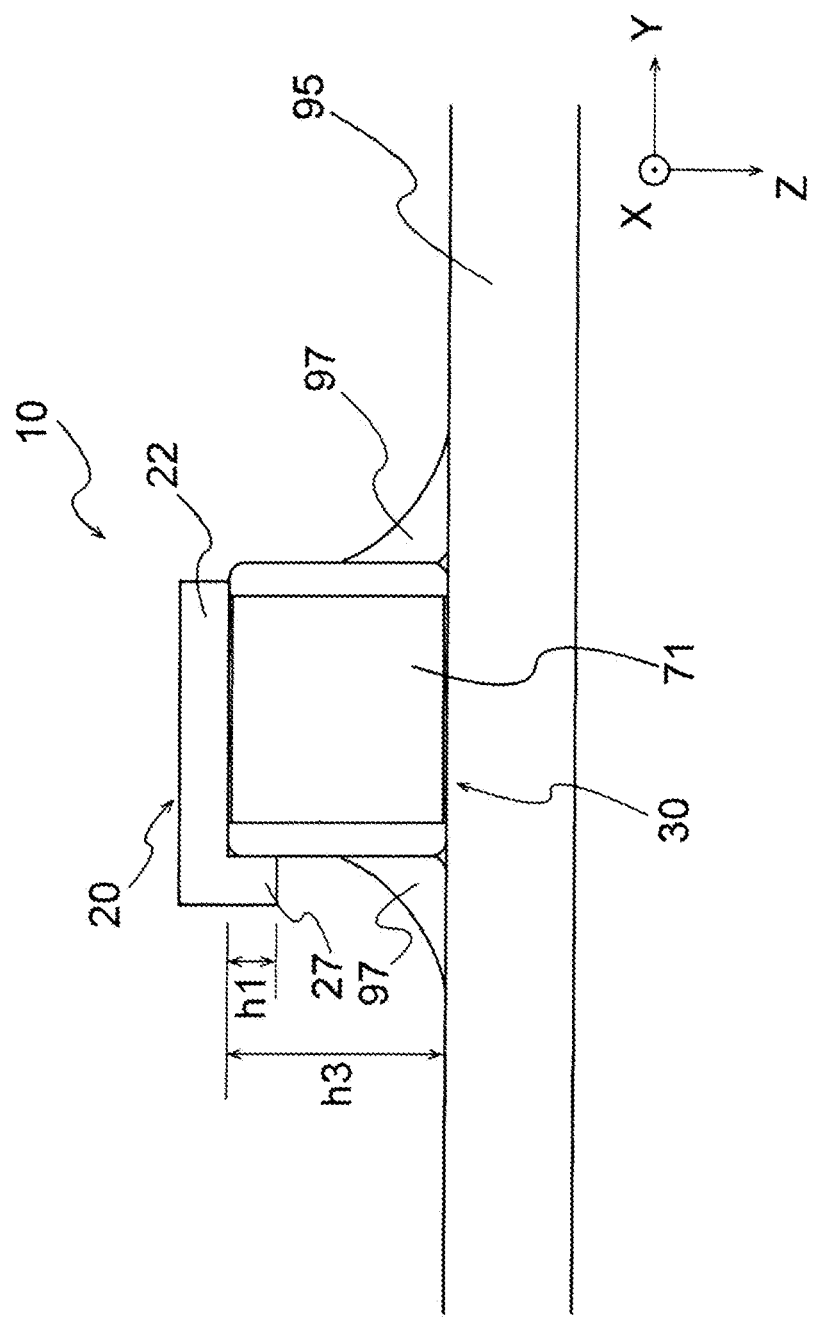
FIG. 8 is a side view of the electronic device and the mounting board shown in FIG. 7 when viewed from side.

Thus, as shown in FIG. 7 and FIG. 8, the chip components 31, 41, 51, 61, and 71 included in the plurality of chip components 30 are surface-mounted on, for example, a mounting board 95 with the second side surfaces 31b of the chip components 31, 41, 51, 61, and 71 as a mounting surface without being hindered by the first protrusion portion 27 and the second protrusion portion 28.

The insulating case 20 shown in FIG. 3 can be manufactured by, for example, resin molding or machining a plate material. The insulating case 20 is made of any insulating material, but is preferably made of a resin material for reduction in stress.

As shown in FIG. 6, the second side surface 31b directed to the downside opposite to the first side surface 31a directed to the upside in the plurality of chip components 30 is disposed along a virtual plane 90 parallel to the plate portion 22. Thus, the virtual plane 90 for disposing the second side surface 31b is a mounting surface of the electronic device 10, and the electronic device 10 is mounted on the mounting board 95 with a land pattern 98 as shown in FIG. 7.

FIG. 8 is a side view of the electronic device 10 mounted on the mounting board 95 when viewed from the positive side in the X-axis. As shown in FIG. 6, the protrusion length h2 of the second protrusion portion 28 of the insulating case 20 from the plate portion 22 toward the downside is not limited as long as it is smaller than the protrusion length h3 of the plurality of chip components 30 from the plate portion 22 toward the downside, but is preferably ½ or less of the protrusion length h3 of the plurality of chip components 30. When the protrusion length h2 of the second protrusion portion 28 is ½ or less of the protrusion length h3 of the plurality of chip components 30, a sufficient interval is formed between the second protrusion portion 28 and the mounting board 95, and it is possible to favorably prevent a problem that the insulating case 20 prevents the formation of a solder fillet 97 to the terminal electrodes.

FIG. 8 is a side view of the electronic device 10 mounted on the mounting board 95 when viewed from the positive side in the X-axis. As shown in FIG. 8, the protrusion length h1 of the first protrusion portion 27 is also preferably ½ or less of the protrusion length h3 of the plurality of chip components 30 as in the second protrusion portion 28.

As shown in FIG. 1 and FIG. 6, the terminal electrodes 33 and 35 of at least two chip components 31, 41, 51, 61, and 71 included in the plurality of chip components 30 (any two adjacent chip components in the embodiment) are contacted with each other. Thus, the plurality of chip components 30 included in the electronic device 10 is connected in parallel. In such an electronic device 10, even if only some of the chip components 31, 41, 51, 61, and 71 are directly mounted on the mounting board 95, all of the chip components 31, 41, 51, 61, and 71 included in the electronic device 10 are electrically connected to the mounting board 95 and appropriately function as capacitors. Since not all of the chip components 31, 41, 51, 61, and 71 need to directly be connected to the board by solder or the like, the electronic device 10 can prevent problems such as mounting defects.

As shown in FIG. 4 and FIG. 5, the plurality of chip components 30 partly protrudes from the plate portion 22 via the plate-portion third side 24c of the plate portion 22. That is, the length from the plate-portion first side 24a to the plate-portion third side 24c is smaller than that from the first end surface 31c to the second end surface 31d of the chip component 31. Since the length of the plate portion 22 in the second direction (Y-axis direction) is smaller than that of the chip components 31, 41, 51, 61, and 71 in the second direction (Y-axis direction), the plate portion 22 can be smaller to reduce the size, and the mounting area can be reduced.

The electronic device 10 shown in FIG. 1 is manufactured by any method and can be manufactured by, for example, the following process. In the method of manufacturing the electronic device 10, first of all, the insulating case 20 shown in FIG. 2 is prepared, and an adhesive agent is applied to the plate-portion bottom surface 24.

Next, as shown in FIG. 4, the chip component 31 is positioned to the insulating case 20 by disposing the chip component 31 on the plate-portion bottom surface 24, bringing the third side surface 31e into contact with the second protrusion portion 28, and bringing the first end surface 31c into contact with the first protrusion portion 27. As with the chip component 31, the components 41, 51, 61, and 71 are also positioned to the insulating case 20 by arranging the components 41, 51, 61, and 71 on the plate-portion bottom surface 24, bringing the first end surfaces directed to the negative side in the Y-axis into contact with the first protrusion portion 27, and arranging the components 41, 51, 61, and 71 in packed manner to the negative side in the X-axis.

Finally, the electronic device 10 shown in FIG. 1 is obtained by curing the adhesive agent connecting between the plate-portion bottom surface 24 and the first side surface 31a of the plurality of chip components 30. The mounting of the chip components 31, 41, 51, 61, and 71 to the plate-portion bottom surface 24 and their positioning may be carried out independently or at the same time for the plurality of chip components 30.

In the electronic device 10, the plurality of chip components 30 can easily be positioned to the insulating case 20 in the vertical direction and the second direction (Y-axis direction) by disposing the plurality of chip components 30 while bringing them into contact with the plate portion 22 and the first protrusion portion 27. The positioning in the first direction (X-axis direction) can be carried out by contact with the second protrusion portion 28 or with the adjacent chip components 41, 51, 61, and 71. Thus, such an electronic device 10 can be assembled by easily and efficiently positioning the plurality of chip components 30 to the insulating case 20.

As shown in FIG. 4, the non-protrusion edge portions 24ca and 24da with no protrusions are formed in the plate-portion third side 24c and the plate-portion fourth side 24d opposite to the side where the first protrusion portion 27 and the second protrusion portion 28 are formed. This makes it easy to mount the chip components 31, 41, 51, 61, and 71 onto the plate-portion bottom surface 24 and also makes it possible to easily and accurately position the plurality of chip components 30 to the insulating case 20 even if the chip components 31, 41, 51, 61, and 71 have dimensional variations. Thus, the electronic device 10 has good manufacturing efficiency and can reduce variations in the arrangement of the chip components 31, 41, 51, 61, and 71 to the insulating case 20.

Figure 9:
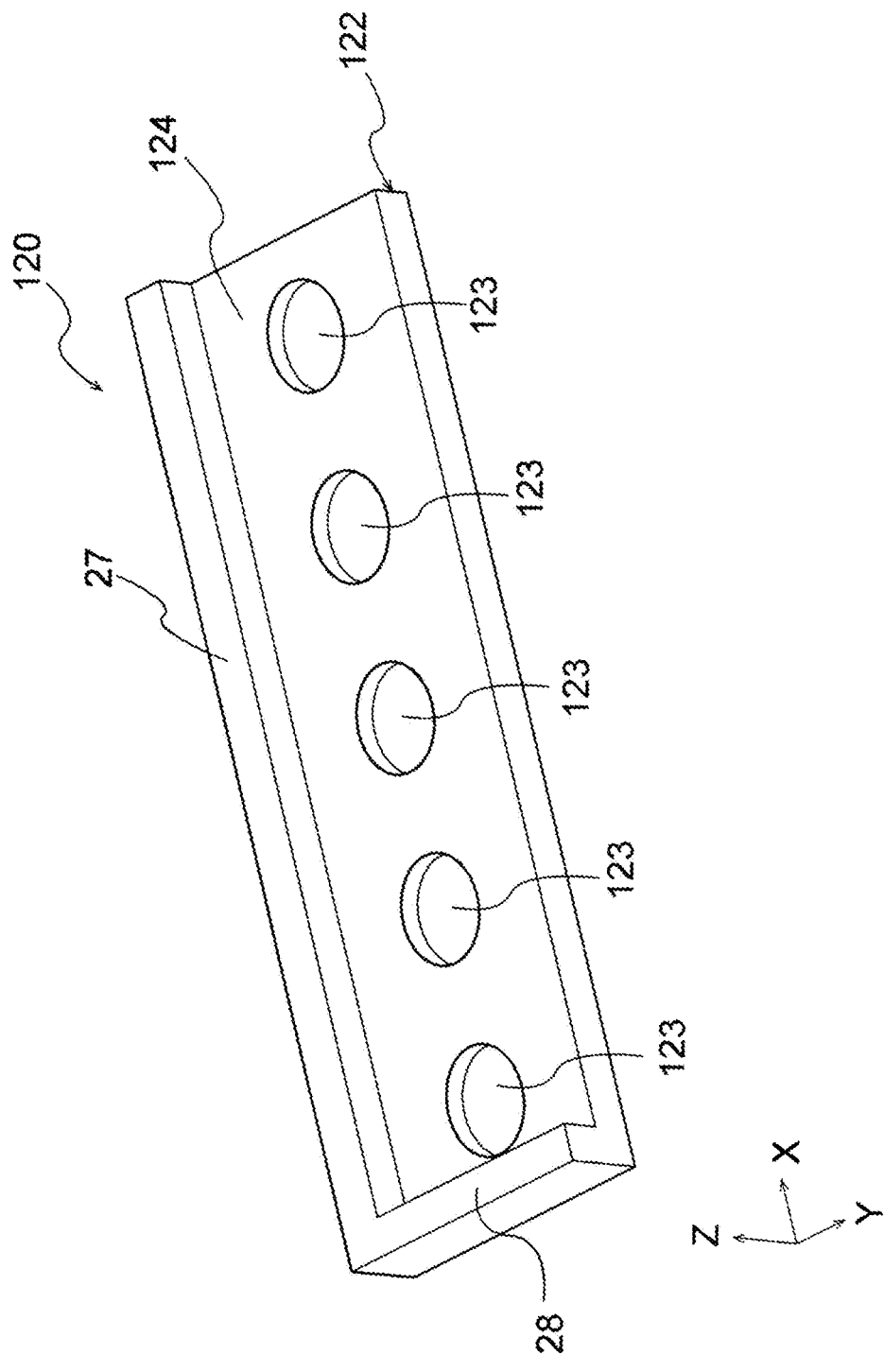
FIG. 9 is a schematic perspective view of an insulating case according to First Modification when viewed from diagonally below.
Figure 10:
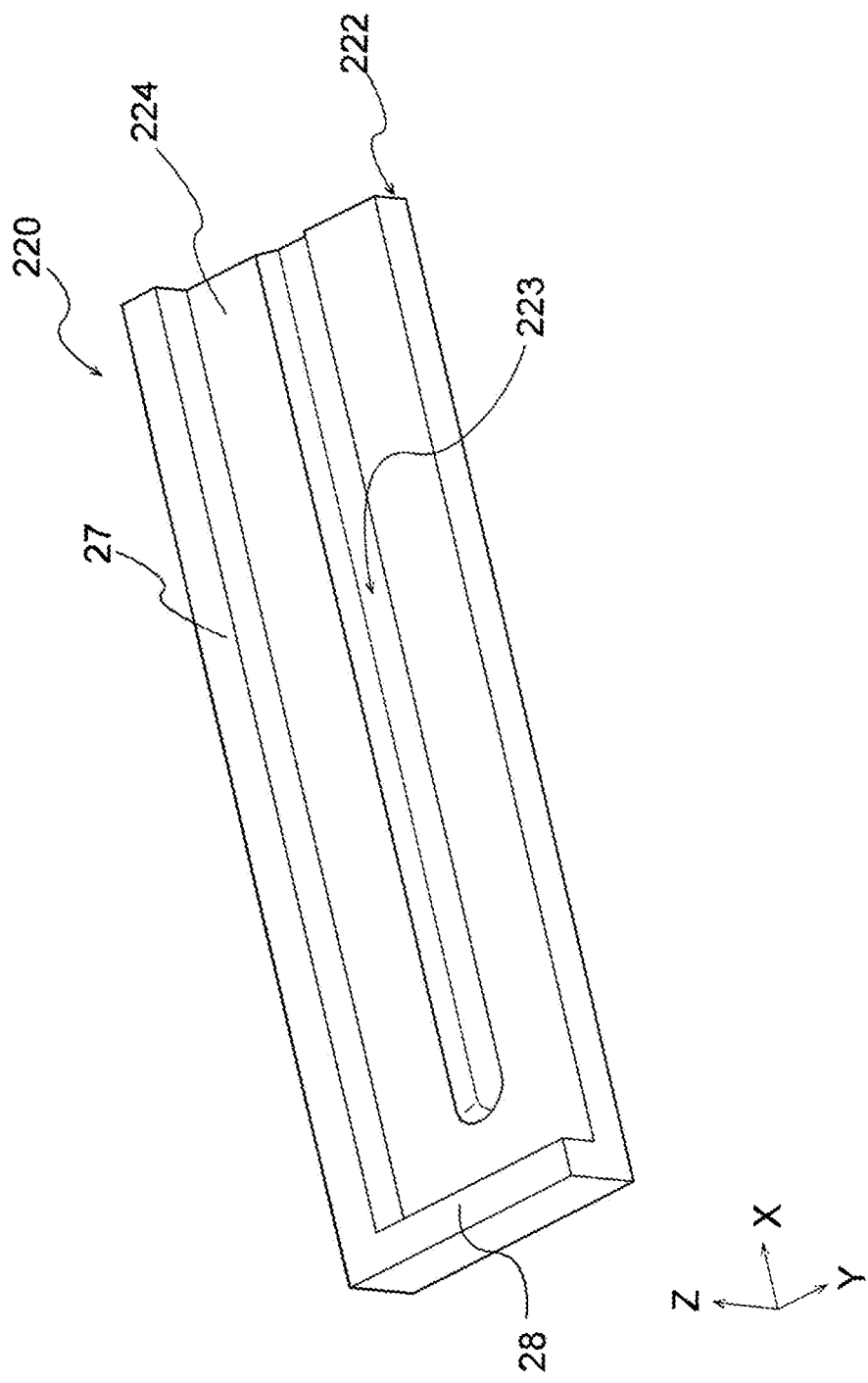
FIG. 10 is a schematic perspective view of an insulating case according to Second Modification when viewed from diagonally below.

The insulating case 20 used for the electronic device 10 is not limited to only one shown in FIG. 2, and the plate portion 22, the first protrusion portion 27, and the second protrusion portion 28 have various modifications other than the shapes shown in FIG. 2. For example, FIG. 9 is a schematic perspective view of an insulating case 120 according to First Modification, and FIG. 10 is a schematic perspective view of an insulating case 220 according to Second Modification. Instead of the insulating case 20 shown in FIG. 2, the insulating case 120 (220) shown in FIG. 9 or FIG. 10 can be used for the electronic device 10.

In a plate portion 122 of the insulating case 120 shown in FIG. 9, a plate-portion bottom surface 124 facing the chip components 31, 41, 51, 61, and 71 (see FIG. 1) is provided with recesses 123. Five recesses 123 are formed on the plate-portion bottom surface 124 so as to correspond with the chip components 31, 41, 51, 61, and 71 fixed to the insulating case 120. The recesses 123 have a substantially circular shape, but the number and shape of recesses 123 are not limited.

Since the recesses 123 are formed on the plate-portion bottom surface 124, an adhesive agent for fixing the chip components 31, 41, 51, 61, and 71 to the insulating case 120 can be prevented from flowing out to portions other than the plate-portion bottom surface 124 in assembling the electronic device. Thus, the electronic device including the insulating case 120 can reduce variations in the shape of an adhesive cured portion joining between the chip components 31, 41, 51, 61, and 71 and the plate-portion bottom surface 124 (see FIG. 2) and appropriately control the joint strength between the chip components 31, 41, 51, 61, and 71 and the plate portion 122.

In a plate portion 222 of the insulating case 220 shown in FIG. 10, a plate-portion bottom surface 224 facing the chip components 31, 41, 51, 61, and 71 (see FIG. 1) is provided with a groove 223. The groove 223 is formed in the X-axis direction (first direction) at a central part of the plate-portion bottom surface 224 in the Y-axis direction. The insulating case 220 shown in FIG. 10 exhibits effects similar to those of the insulating case 120 shown in FIG. 9.

Second Embodiment

Figure 11:
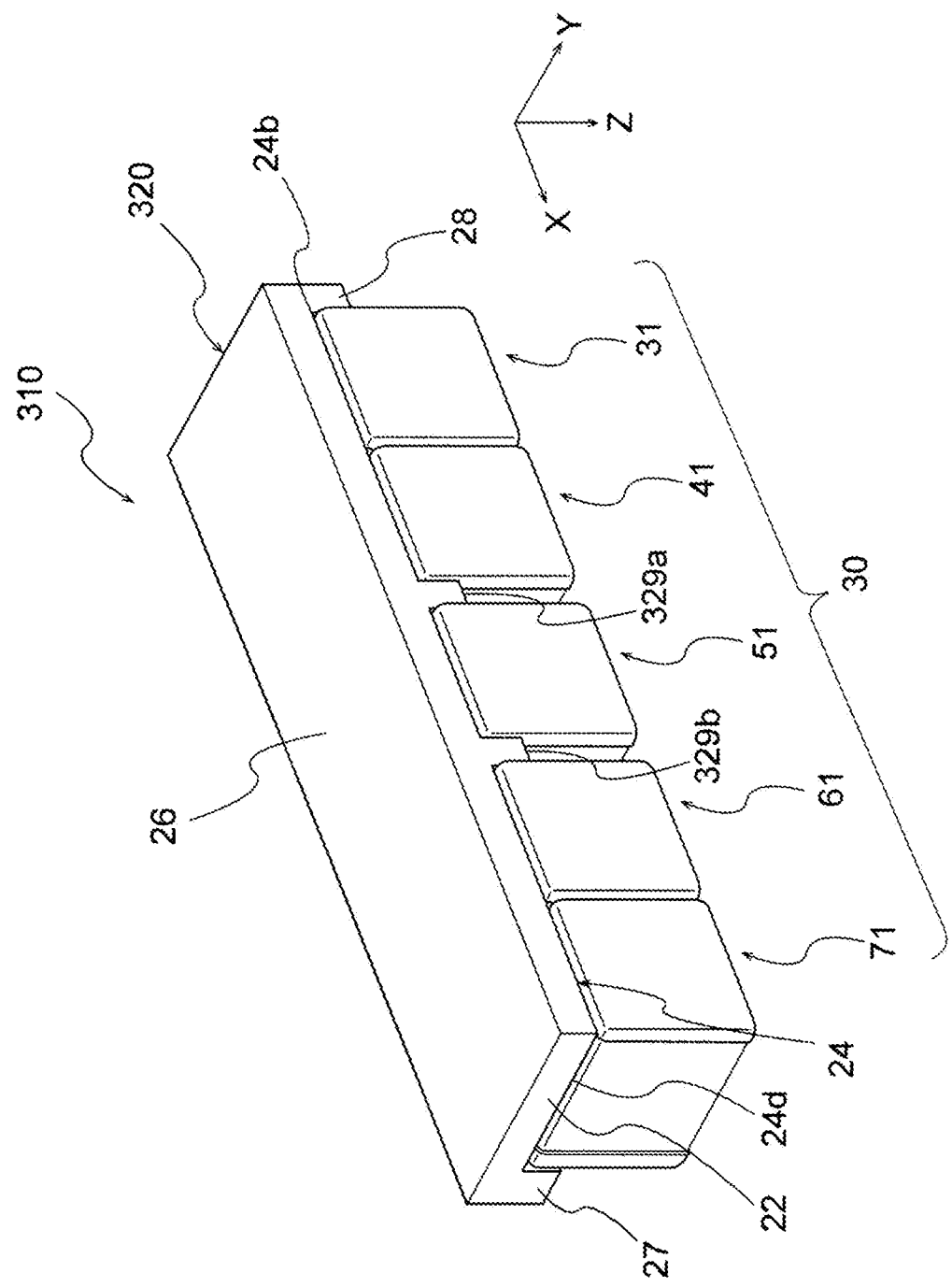
FIG. 11 is a schematic perspective view of an electronic device according to Second Embodiment of the present invention from diagonally above.

FIG. 11 is a schematic perspective view of an electronic device 310 according to Second Embodiment from diagonally above. The electronic device 310 is similar to the electronic device 10 according to First Embodiment except that an insulating case 320 includes third protrusion portions 329a and 329b, and that the terminal electrodes of the chip component 51 are separated from those of the adjacent chip components 41 and 61. The electronic device 310 is mainly explained for differences from the electronic device 10, and common matters with the electronic device 10 are not explained.

As shown in FIG. 11, the insulating case 320 includes two third protrusion portions 329a and 329b. As with the second protrusion portion 28, the third protrusion portions 329a and 329b are formed to the first protrusion portion 27 in the second direction (Y-axis direction) perpendicular to the first direction and the downside and protrude from the plate portion 22 toward the downside.

The second protrusion portion 28 is formed in the plate-portion second side 24b of the plate-portion bottom surface 24, but the third protrusion portions 329a and 329b are formed between the plate-portion second side 24b and the plate-portion fourth side 24d. That is, the chip components 31 and 41 are arranged between the second protrusion portion 28 and the third protrusion portions 329a along the plate-portion second side 24b, and the chip component 51 is disposed between the third protrusion portions 329a and the third protrusion portions 329b. Moreover, the chip components 61 and 71 are arranged on the positive side of the third protrusion portions 329b (plate-portion fourth side 24d side) in the X-axis direction.

In the electronic device 310, since the third protrusion portions 329a and 329b are formed, the terminal electrodes of at least one chip component 51 included in the plurality of chip components 30 and at least adjacent another chip component 41 (61) are separated from each other. Since the third protrusion portions 329a and 329b are formed at any position, the electronic device 310 can change electric connection or insulation of the terminal electrodes of the plurality of chip components 30 next to each other. Thus, for example, the electronic device 310 can function as a plurality of capacitors having different capacitances. The electronic device 310 exhibits effects similar to those of the electronic device 10 for the common matters with the electronic device 10.

Third Embodiment

Figure 12:
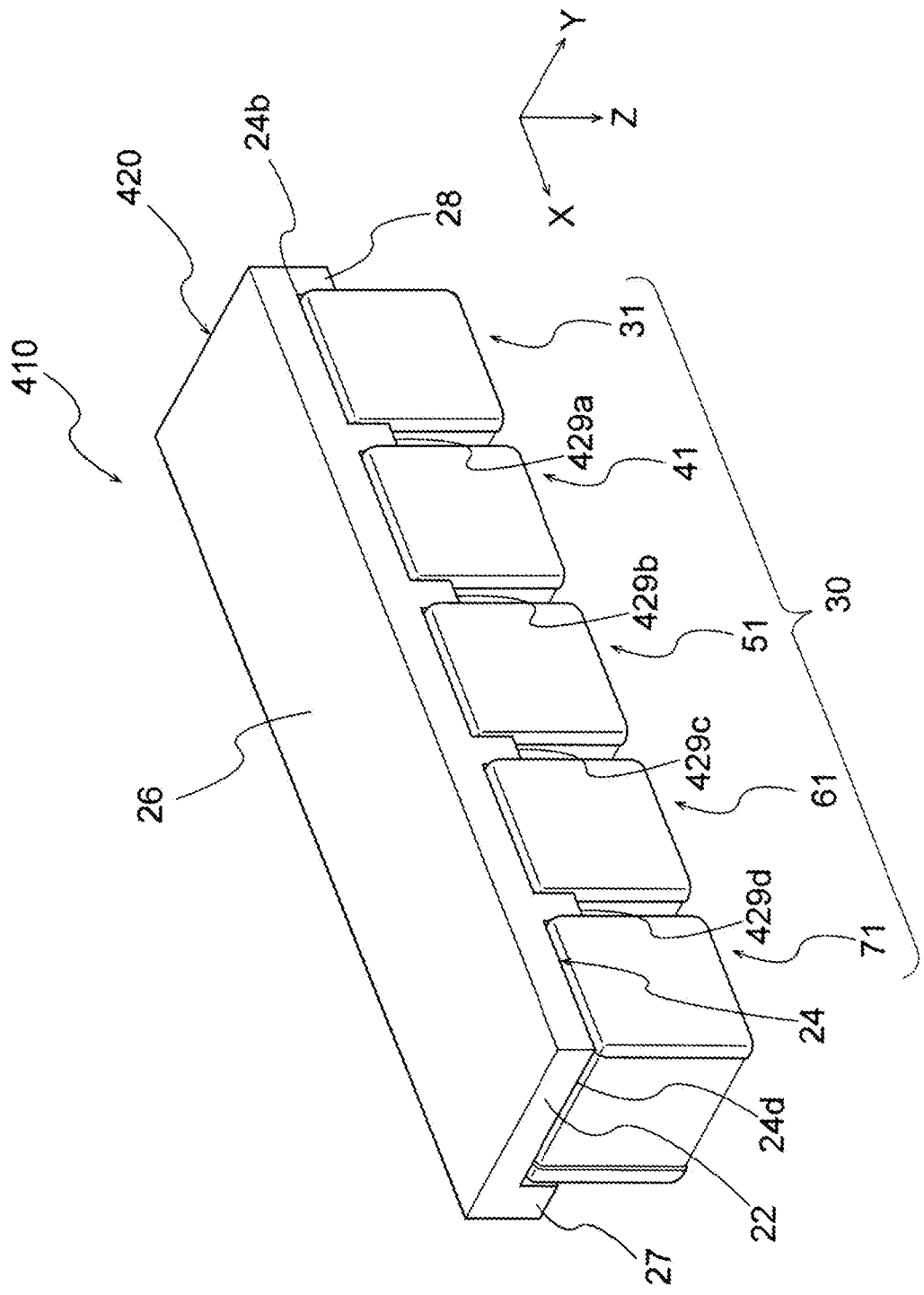
FIG. 12 is a schematic perspective view of an electronic device according to Third Embodiment of the present invention from diagonally above.

FIG. 12 is a schematic perspective view of an electronic device 410 according to Third Embodiment of the present invention from diagonally above. The electronic device 410 is similar to the electronic device 10 according to First Embodiment except that an insulating case 420 includes third protrusion portions 429a, 429b, 429c, and 429d, and that the terminal electrodes of the chip component 31, 41, 51, 61, and 71 are separated from those of the other adjacent chip components 31, 41, 51, 61, and 71. The electronic device 410 is mainly explained for differences from the electronic device 10, and common matters with the electronic device 10 are not explained.

As shown in FIG. 12, the insulating case 420 of the electronic device 410 includes four third protrusion portions 429a, 429b, 429c, and 429d. As with the second protrusion portion 28, the third protrusion portions 429a, 429b, 429c, and 429d are formed to the first protrusion portion 27 in the second direction (Y-axis direction) perpendicular to the first direction and the downside and protrude from the plate portion 22 toward the downside.

The third protrusion portions 429a, 429b, 429c, and 429d are formed between the plate-portion second side 24b and the plate-portion fourth side 24d. That is, the chip component 31 is disposed between the second protrusion portion 28 and the third protrusion portion 429a, and the chip component 41 is disposed between the third protrusion portion 429a and the third protrusion portion 429b. Moreover, the chip component 51 is disposed between the third protrusion portion 429b and the third protrusion portion 429c, and the chip component 61 is disposed between the third protrusion portion 429c and the third protrusion portion 429d. Moreover, the chip component 71 is disposed on the positive side of the third protrusion portion 429b (plate-portion fourth side 24d side) in the X-axis direction.

In the electronic device 410, since the third protrusion portions 429a, 429b, 429c, and 429d are formed, the terminal electrodes of the chip components 31, 41, 51, 61, and 71 included in the plurality of chip components 30 and the other adjacent chip components 31, 41, 51, 61, and 71 are separated from each other. Since the third protrusion portions 429a, 429b, 429c, and 429d are arranged between the chip components 31, 41, 51, 61, and 71, the plurality of chip components 30 of the electronic device 410 are held in a mutually insulated state. Thus, the electronic device 410 can freely connect the chip components 31, 41, 51, 61, and 71 on the mounting board side and form various circuits. The electronic device 410 exhibits effects similar to those of the electronic device 10 for the common matters with the electronic device 10.

Fourth Embodiment

Figure 13:
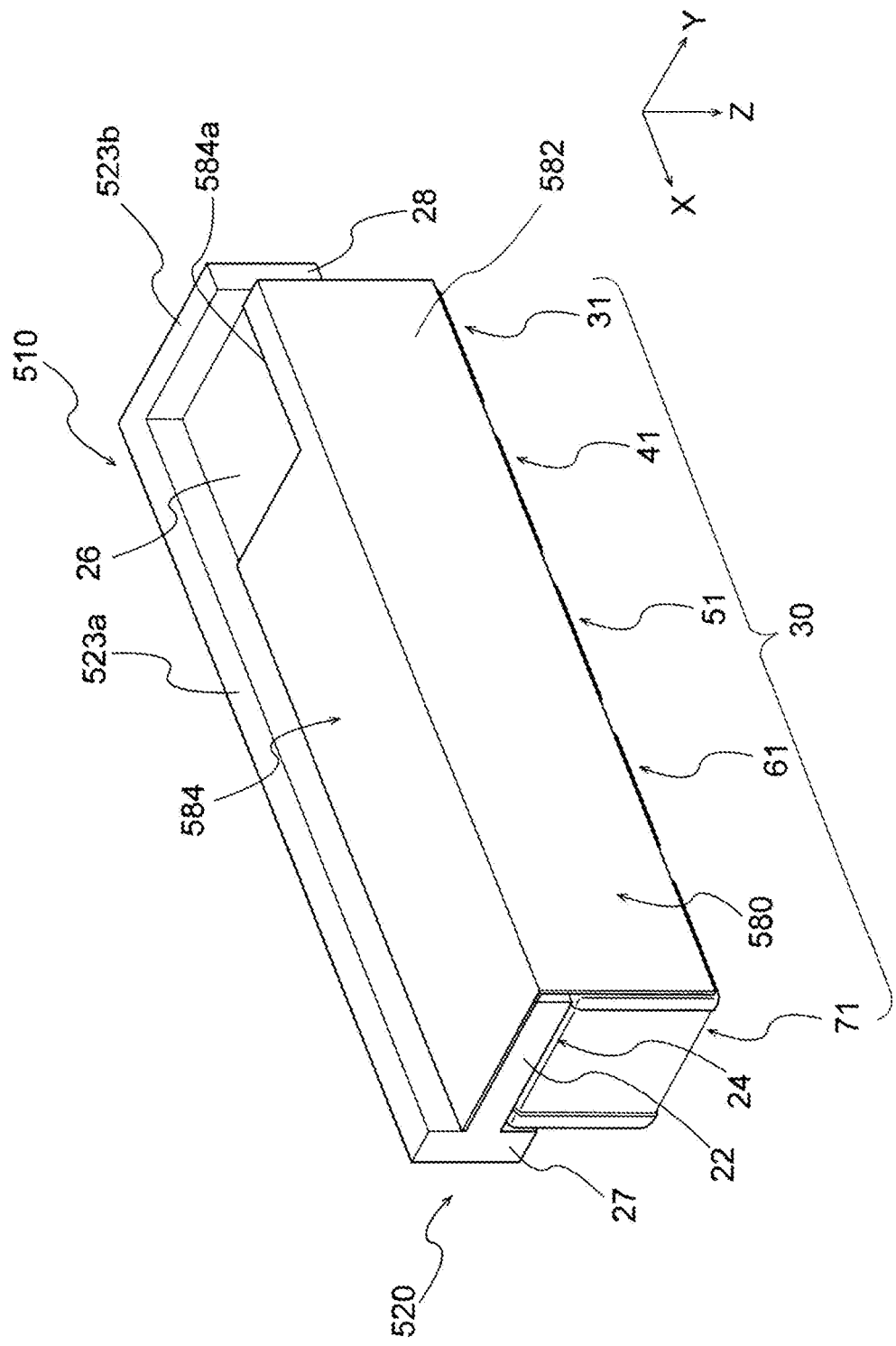
FIG. 13 is a schematic perspective view of an electronic device according to Fourth Embodiment of the present invention from diagonally above.

FIG. 13 is a schematic perspective view of an electronic device 510 according to Fourth Embodiment of the present invention from diagonally above. The electronic device 510 is similar to the electronic device 410 according to Third Embodiment except that the electronic device 510 includes a heat dissipation plate 580, and that an insulating case 520 includes upper protrusion portions 523a and 523b. The electronic device 510 is mainly explained for differences from the electronic device 410, and common matters with the electronic device 410 are not explained.

As shown in FIG. 13, the electronic device 510 includes a heat dissipation plate 580 for dissipating heat from the plurality of chip components 30. The heat dissipation plate 580 includes a top-surface heat dissipation portion 584 extending in the horizontal direction and a heat transmission portion 582 extending perpendicularly to the top-surface heat dissipation portion 584. The heat transmission portion 582 is disposed so as to face the terminal electrodes 35 and 75 included in the plurality of chip components 30 and receives heat from the plurality of chip components 30. The top-surface heat dissipation portion 584 is disposed on a plate-portion top surface 26 of the plate portion 22 of the insulating case 520. The plate-portion top surface 26 is a surface of the plate portion 22 directed opposite to the plate-portion bottom surface 24 facing the chip components 31, 41, 51, 61, and 71.

The heat dissipation plate 580 is made of a material having a thermal conductivity higher than that of the insulating case 520 (e.g., a metal (alloy) material such as Al and stainless steel). The heat dissipation plate 580 is formed by, for example, machining a metal plate.

Figure 14:
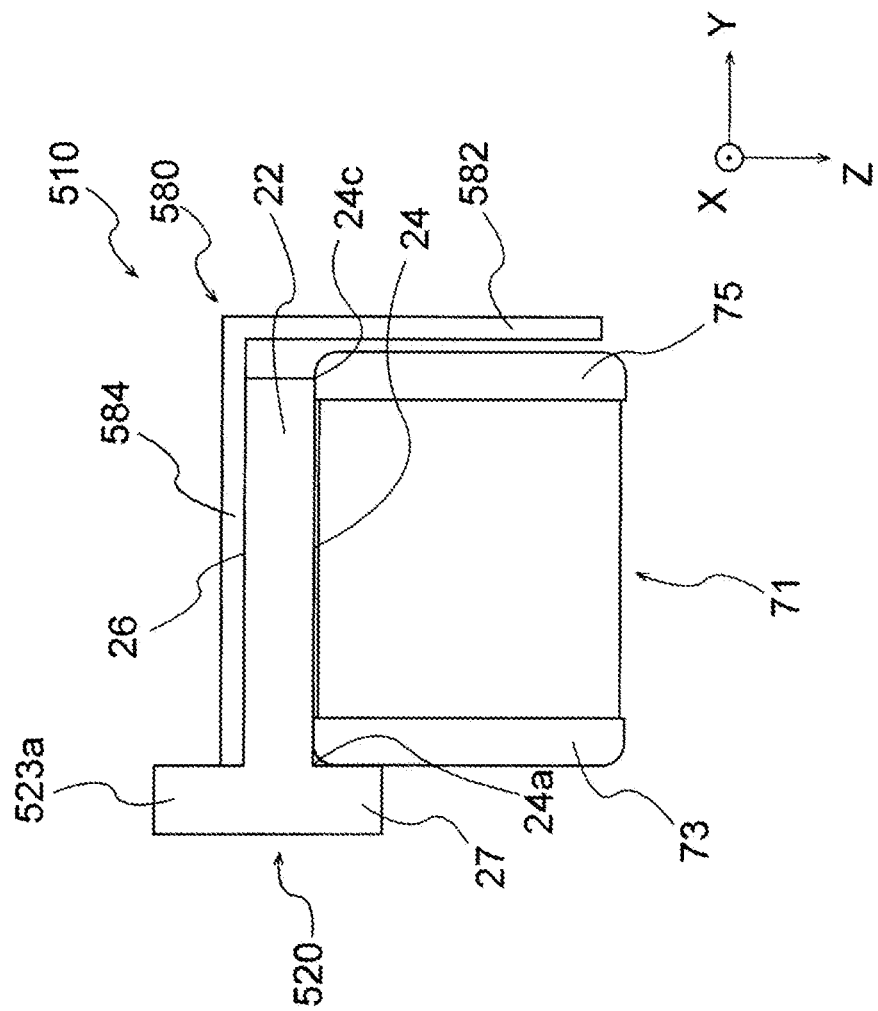
FIG. 14 is a side view of the electronic device shown in FIG. 13 when viewed from a first direction.

FIG. 14 is a side view of the electronic device 510 shown in FIG. 13 when viewed from the positive side in the X-axis. As shown in FIG. 14, the top-surface heat dissipation portion 584 of the heat dissipation plate 580 is adhered to the plate-portion top surface 26, and the heat dissipation plate 580 is joined with the insulating case 520 via the top-surface heat dissipation portion 584. As explained in First Embodiment, the first side surface 31*a* (see FIG. 2) of the plurality of chip components 30 is adhered to the plate-portion bottom surface 24, and both of the heat dissipation plate 580 and the plurality of chip components 30 are fixed to the insulating case 520 via the plate portion 22.

As shown in FIG. 13, the insulating case 520 includes the upper protrusion portions 523*a* and 523*b* protruding upward from the plate-portion top surface 26. The upper protrusion portion 523*a* is formed along the plate-portion first side 24*a* as in the first protrusion portion 27, and the upper protrusion portion 523*b* is formed along the plate-portion second side 24*b* as in the second protrusion portion 28. In assembling the electronic device 510, the heat dissipation plate 580 can easily be positioned to the insulating case 520 by bringing the top-surface heat dissipation portion 584 into contact with the upper protrusion portions 523*a* and 523*b*.

As shown in FIG. 14, the heat transmission portion 582 of the heat dissipation plate 580 faces the chip component 71 with a predetermined gap. Even if there is such a gap between the heat transmission portion 582 and the chip component 71, the heat transmission portion 582 and the terminal electrode 75 of the chip component 71 are connected by solder in mounting the electronic device 510 onto the board (see FIG. 8). Thus, the heat generated in the chip component 71 is efficiently transmitted to the heat transmission portion 582 via a joint member, such as solder, and the temperature rise of the chip component 71 can be prevented.

Among the pair of terminal electrodes 73 and 75 of the chip component 71, as shown in FIG. 14, the heat transmission portion 582 of the heat dissipation plate 580 faces the terminal electrode 75 closer to the plate-portion third side 24*c* than the plate-portion first side 24*a*. Since the plate-portion third side 24*c* is provided with a non-protrusion edge portion with no protrusion, the heat transmission portion 582 and the terminal electrode 75 can be arranged close to each other, and the heat dissipation efficiency of the electronic device 510 can be increased. Unlike the arrangement shown in FIG. 14, the heat transmission portion 582 and the terminal electrode 75 may be contacted with each other.

The electronic device 510 including the heat dissipation plate 580 efficiently dissipates the heat generated in the plurality of chip components 30 and can prevent the temperature rise of the electronic device 510. Since the heat dissipation plate 580 includes the top-surface heat dissipation portion 584, the heat generated in the plurality of chip components 30 can more efficiently be dissipated to outside. As shown in FIG. 13, the top-surface heat dissipation portion 584 may be provided with a notch 584*a* for partly exposing the plate-portion top surface 26. A mark or engraving (including information such as a two-dimensional bar code) may be formed on the plate-portion top surface 26 of the insulating case 520 made of resin or the like.

The electronic device 510 according to Fourth Embodiment exhibits effects similar to those of the electronic device 410 according to Third Embodiment for the common matters with the electronic device 410.

Fifth Embodiment

Figure 15:
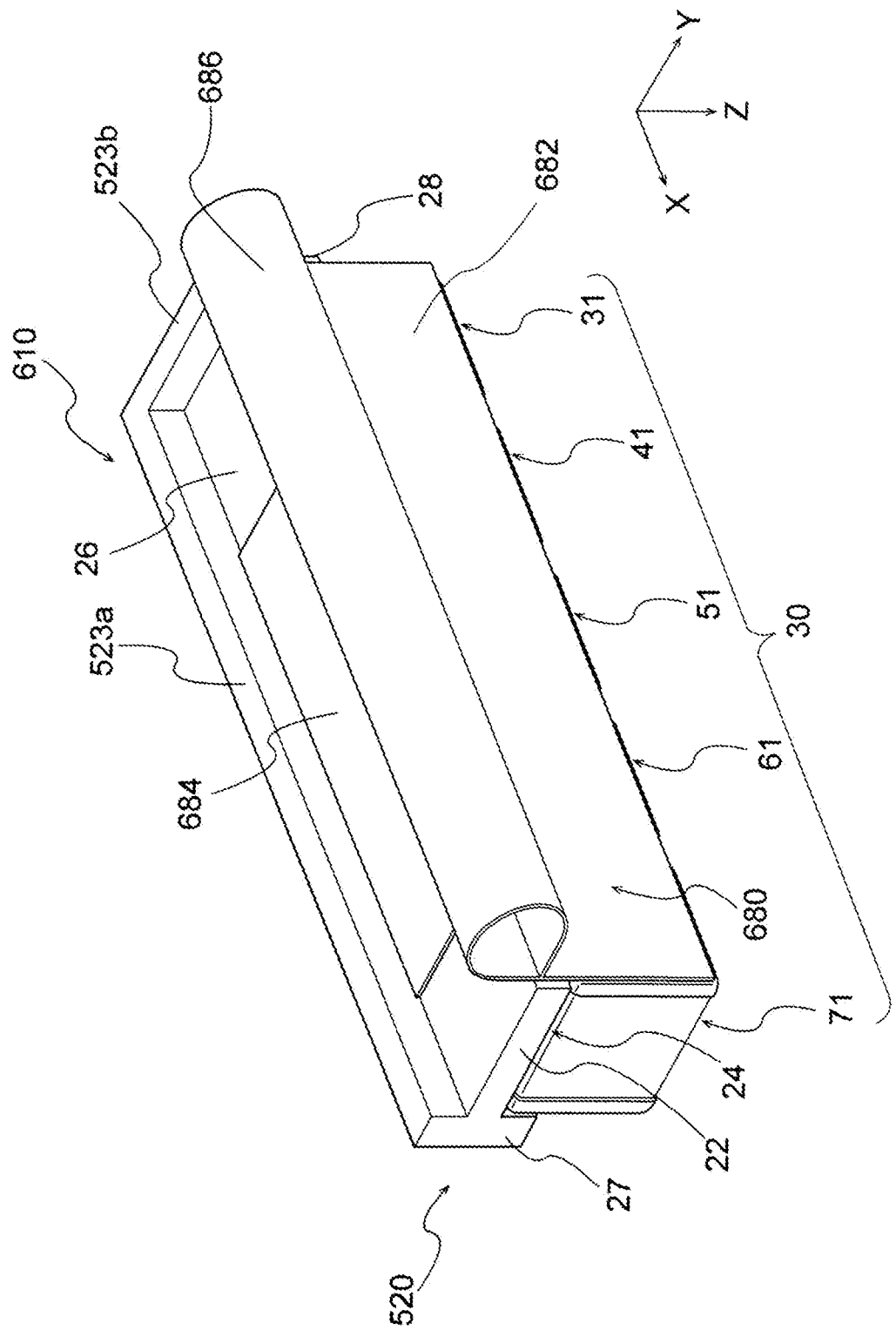
FIG. 15 is a schematic perspective view of an electronic device according to Fifth Embodiment of the present invention from diagonally above.

FIG. 15 is a schematic perspective view of an electronic device 610 according to Fifth Embodiment of the present invention from diagonally above. Except for the shape of a heat dissipation plate 680, the electronic device 610 is similar to the electronic device 510 shown in FIG. 13. The electronic device 610 is mainly explained for differences from the electronic device 510, and common matters with the electronic device 510 are not explained.

As shown in FIG. 15, the electronic device 610 includes a heat dissipation plate 680 for dissipating heat from the plurality of chip components 30. The heat dissipation plate 680 is different from the heat dissipation plate 580 of the electronic device 510 shown in FIG. 13 in terms of the shape of a top-surface heat dissipation portion 684 and the inclusion of a cylindrical heat dissipation portion 686, but a heat transmission portion 682 is similar to the heat transmission portion 582 of the heat dissipation plate 580.

The cylindrical heat dissipation portion 686 has a cylindrical shape extending in the first direction (X-axis direction). As with the top-surface heat dissipation portion 684, the cylindrical heat dissipation portion 686 dissipates the heat generated in the plurality of chip components 30 to outside. Since the heat dissipation plate 680 including the cylindrical heat dissipation portion 686 can increase a surface area for heat dissipation, the temperature rise of the electronic device 610 can be prevented efficiently.

The heat dissipation plate 680 can be manufactured by, for example, bending a plate material made of metal or so. The electronic device 610 according to Fifth Embodiment exhibits effects similar to those of the electronic device 510 for the common matters with the electronic device 510.

Sixth Embodiment

Figure 16:
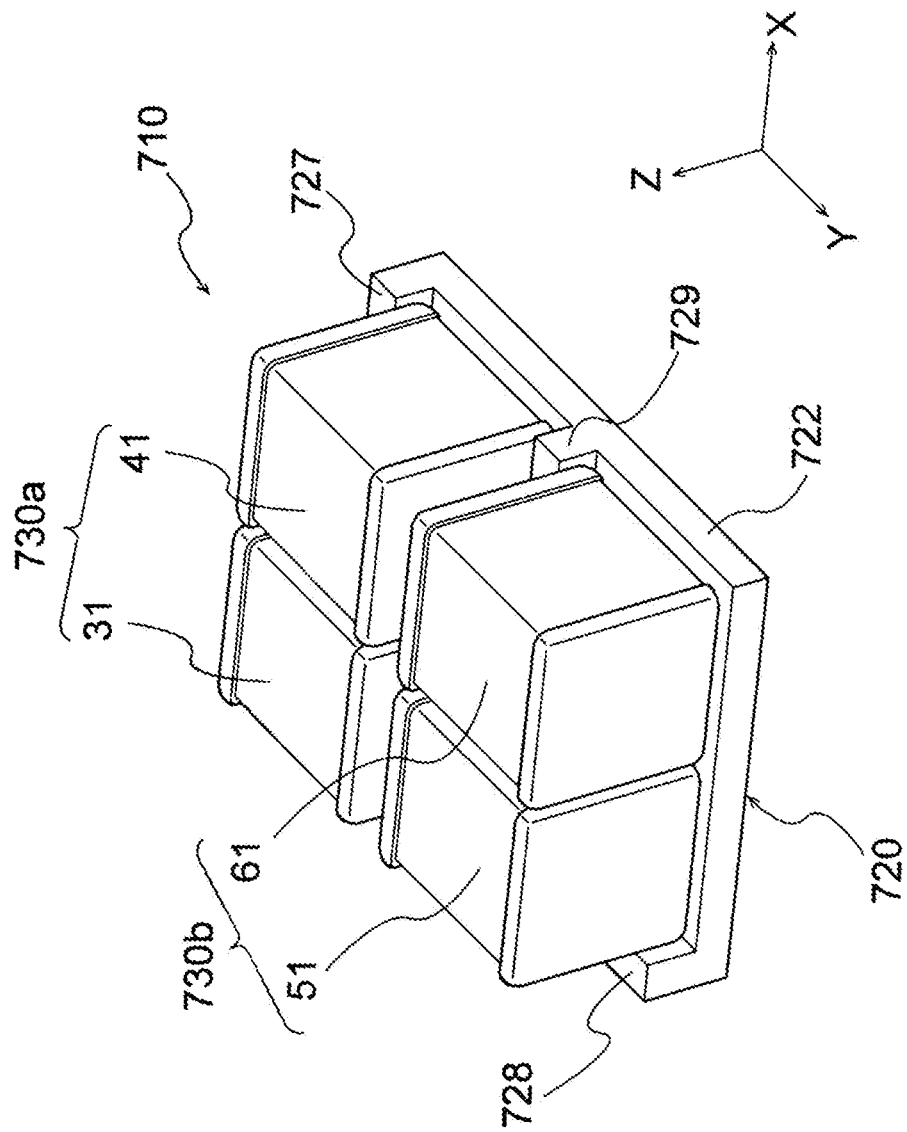
FIG. 16 is a schematic perspective view of an electronic device according to Sixth Embodiment of the present invention from diagonally below.

FIG. 16 is a schematic perspective view of an electronic device 710 according to Sixth Embodiment of the present invention from diagonally below. The electronic device 710 is similar to the electronic device 10 according to First Embodiment except that the chip components 31, 41, 51, 61, and 71 are arranged in matrix manner, and that an insulating case 720 has different lengths in the X-axis direction and the Y-axis direction. The electronic device 710 is mainly explained for differences from the electronic device 10, and common matters with the electronic device 10 are not explained.

In the electronic device 710, as shown in FIG. 16, two pairs of a plurality of chip components 730*a* and 730*b* of the chip components 31 and 41 and the chip components 51 and 61 are arranged in the first direction (X-axis direction). The chip components 31 and 51 and the chip components 41 and 61 are arranged in the second direction (Y-axis direction).

Figure 17:
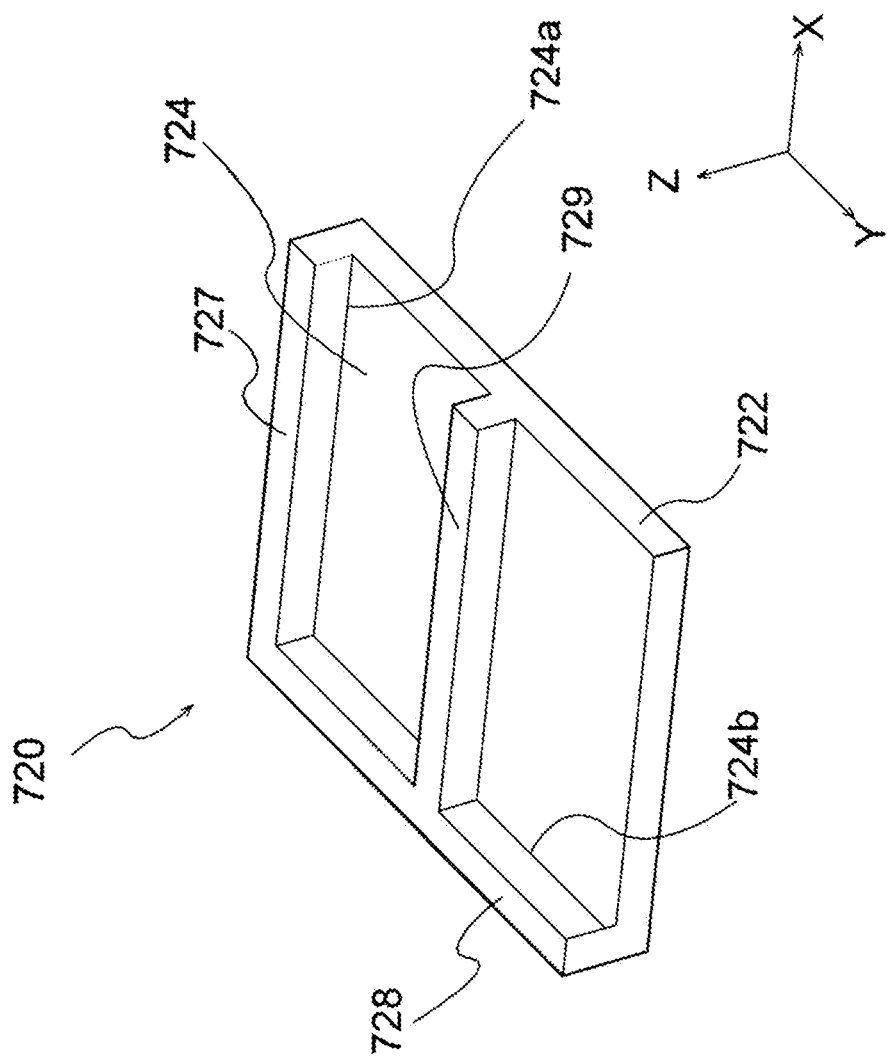
FIG. 17 is a schematic perspective view of an insulating case of the electronic device shown in FIG. 16 from diagonally below.

FIG. 17 is a schematic perspective view of an insulating case 720 included in the electronic device 710 from diagonally below. The insulating case 720 includes a plate portion 722, a first protrusion portion 727, a second protrusion portion 728, and a fourth protrusion portion 729. The first protrusion portion 727 is formed along a plate-portion first side 724*a*, and the second protrusion portion 728 is formed along a plate-portion second side 724*b*. The fourth protrusion portion 729 is formed in parallel to the first protrusion portion 727 with a predetermined interval from the first protrusion portion 727. The first side surfaces 31, which are the upper surfaces of the chip components 31, 41, 51, and 61 shown in FIG. 16, are fixed by adhesion to a plate-portion bottom surface 724 of the plate portion 722 in the insulating case 720 shown in FIG. 17.

In the electronic device 710, as shown in FIG. 16, a plurality (two in the embodiment) of chip components 31 and 41 is disposed along the first protrusion portion 727 extending in the first direction. The pair of terminal electrodes included in the chip component 31 is connected to the pair of terminal electrodes included in another chip component 41 adjacent in the first direction, respectively.

In the electronic device 710, a plurality (two in the embodiment) of chip components 51 and 61 is disposed along the fourth protrusion portion 729 extending in the first direction. The pair of terminal electrodes included in the chip component 51 is connected to the pair of terminal electrodes included in another chip component 61 adjacent in the first direction, respectively.

In the electronic device 710, the chip component 31 and the chip component 41 arranged along the first protrusion portion 727 and contacted with each other are connected in parallel. Likewise, the chip component 51 and the chip component 61 arranged along the fourth protrusion portion 729 and contacted with each other are connected in parallel.

In the electronic device 710, the chip components 31, 41, 51, and 61 may all be arranged in a matrix of two rows and two columns, and adjacent chip components may be connected in parallel. In the electronic device 710, the chip components 31 and 51 and the chip components 41 and 61 adjacent in the second direction (Y-axis direction) are insulated from each other by the fourth protrusion portion 729. Unlike this, the chip components adjacent in the second direction may be connected in series without disposing the fourth protrusion portion 729.

As shown in FIG. 16, the electronic device 710 can configure various electronic devices with different electric connections of the chip components 31, 51, 61, and 71 by changing the arrangement of the chip components 31, 51, 61, and 71 fixed to the insulating case 720 and the formation number of fourth protrusion portions 729. In any case, the chip components 31, 51, 61, and 71 are easily positioned to the insulating case 720 by the first protrusion portion 727, the second protrusion portion 728, and the fourth protrusion portion 729, and the electronic device 710 is thereby excellent in productivity.

The electronic device 710 according to Sixth Embodiment exhibits effects similar to those of the electronic device 10 according to First Embodiment for the common matters with the electronic device 10.

Seventh Embodiment

Figure 18:
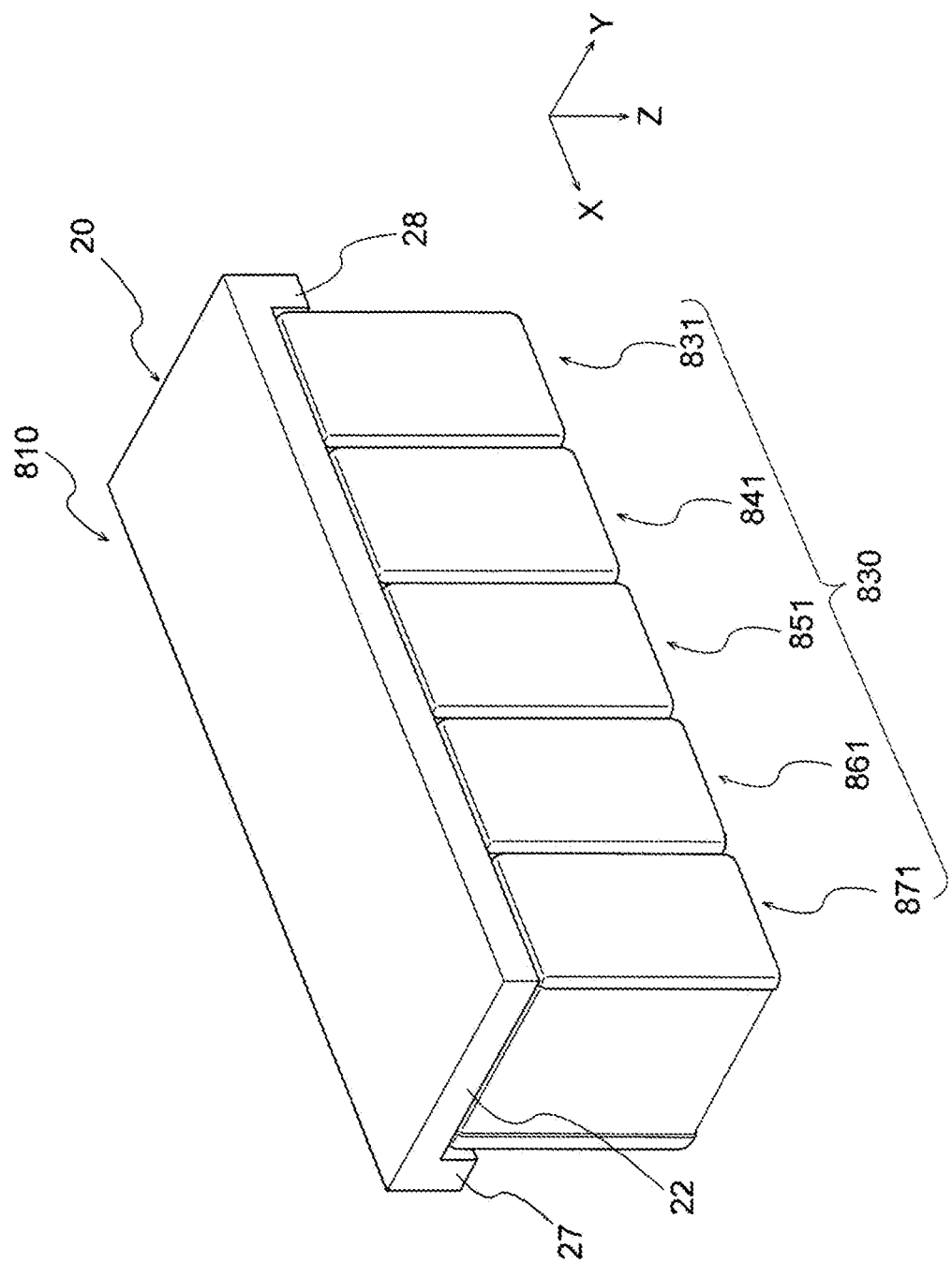
FIG. 18 is a schematic perspective view of an electronic device according to Seventh Embodiment of the present invention from diagonally above.

FIG. 18 is a schematic perspective view of an electronic device 810 according to Seventh Embodiment of the present invention from diagonally above. Except for the sizes of chip components 831, 841, 851, 861, and 871 in the Z-axis, the electronic device 810 is similar to the electronic device 10 according to First Embodiment. The electronic device 810 is mainly explained for differences from the electronic device 10, and common matters with the electronic device 10 are not explained.

In the chip components 831, 841, 851, 861, and 871 included in a plurality of chip components 830 included in the electronic device 810, as shown in FIG. 18, the length in the Z-axis direction is larger than that in the X-axis direction. The chip components fixed to the insulating case 20 may be those whose end surfaces are substantially square as shown in FIG. 1 or those whose end surfaces are substantially rectangular as shown in FIG. 18.

The electronic device 810 according to Seventh Embodiment exhibits effects similar to those of the electronic device 10 according to First Embodiment for the common matters with the electronic device 10.

Eighth Embodiment

Figure 19:
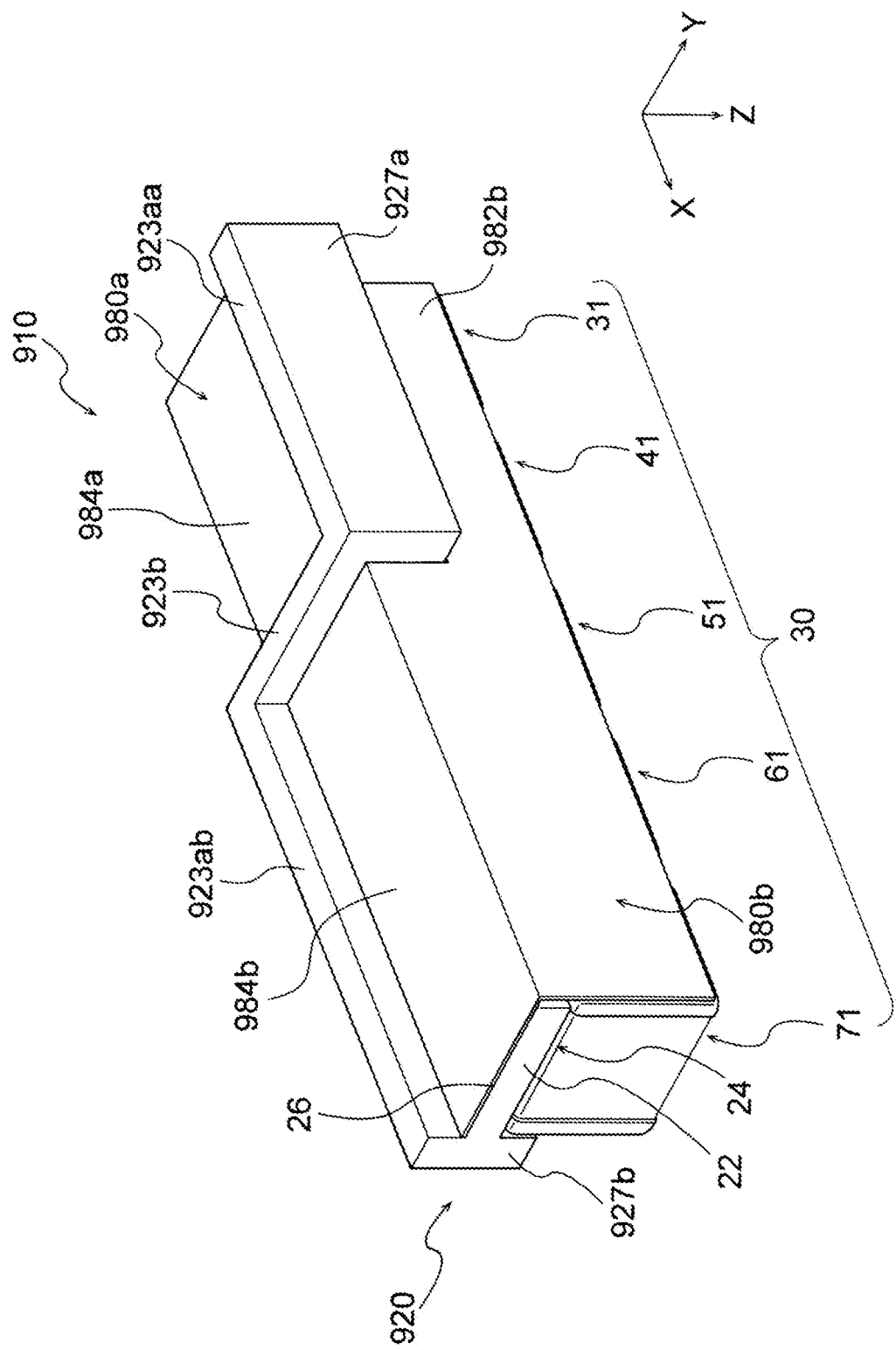
FIG. 19 is a schematic perspective view of an electronic device according to Eighth Embodiment of the present invention from diagonally above.

FIG. 19 is a schematic perspective view of an electronic device 910 according to Eighth Embodiment of the present invention from diagonally above. The electronic device 910 is different from the electronic device 510 shown FIG. 13 and FIG. 14 in that first protrusion portions 927a and 927b are arranged separately on two sides of the plate portion 22 facing each other, and that heat dissipation plates 980a and 980b are divided into two members, but the other matters are the same as the electronic device 510 according to Fourth Embodiment. The electronic device 910 is mainly explained for differences from the electronic device 510, and common matters with the electronic device 510 are not explained.

Figure 21:
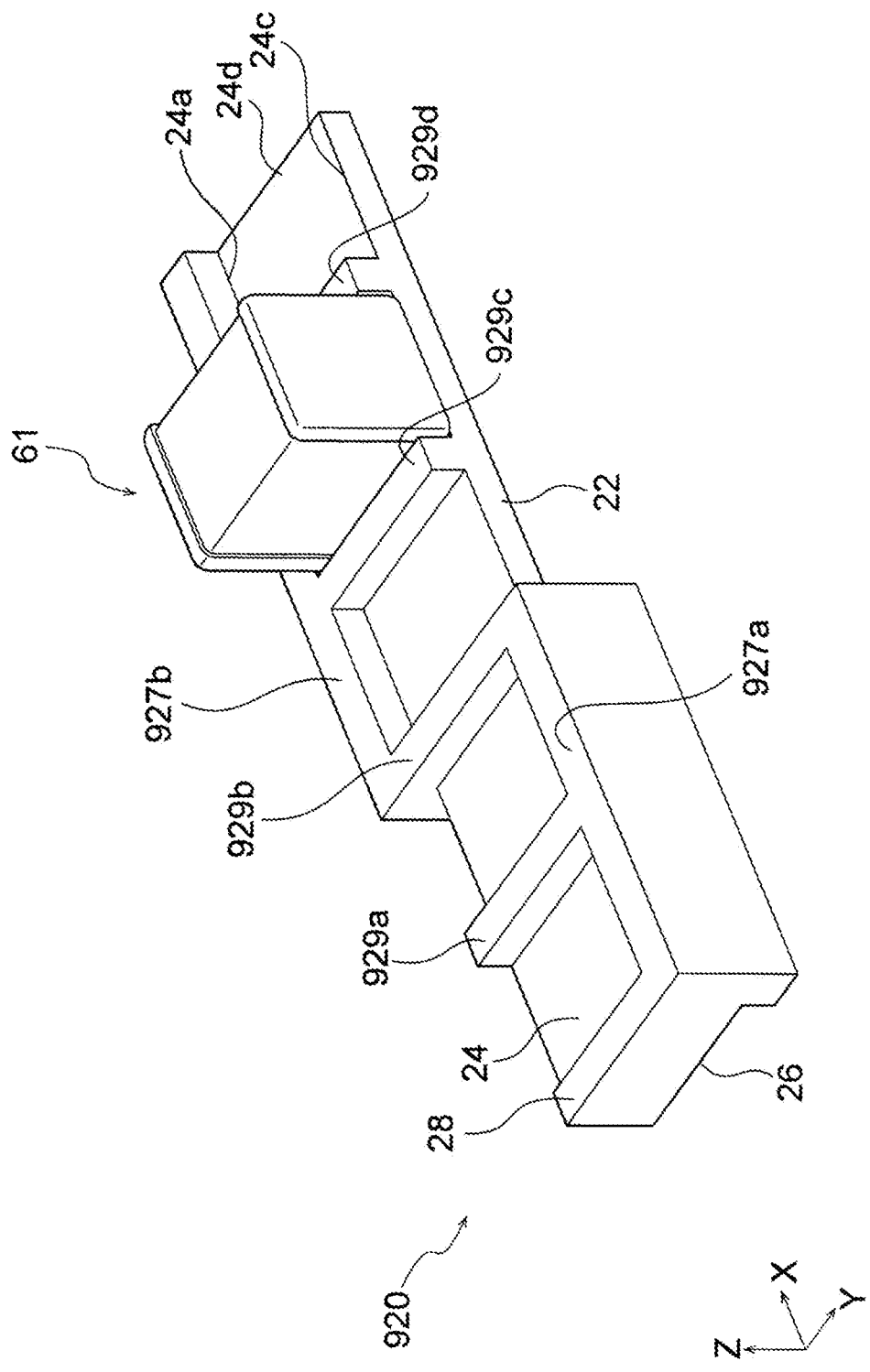
FIG. 21 is a schematic perspective view of an insulating case etc. of the electronic device shown in FIG. 19 from diagonally below.

As shown in FIG. 19, the electronic device 910 includes first protrusion portions 927a and 927b. As shown in FIG. 21, which is a perspective view of an insulating case 920 and the chip component 61 when viewed from diagonally below, the first protrusion portion 927a is formed along the plate-portion third side 24c parallel to the first direction, and the first protrusion portion 927b is formed along the plate-portion first side 24a parallel to the first direction. Both of the first protrusion portions 927a and 927b protrude from the plate portion 22 toward the downside perpendicular to the first direction.

As shown in FIG. 21, the insulating case 920 includes third protrusions 929a, 929b, 929c, and 929d, and the terminal electrodes of the chip components 31, 41, 51, 61, and 71 are separated from those of the other adjacent chip components 31, 41, 51, 61, and 71. The shape and arrangement of the third protrusion portions 929a, 929b, 929c, and 929d are similar to those of the third protrusions 429a, 429b, 429c, and 429d of the electronic device 410 according to Third Embodiment shown in FIG. 12.

As shown in FIG. 21, one end of the first protrusion portion 927a is connected to the second protrusion portion 28, and the other end of the first protrusion portion 927a is connected to one end of the third protrusion portion 929b. One end of the first protrusion portion 927b is connected to the other end of the third protrusion portion 929b, and the other end of the first protrusion portion 927b continues to the end of the plate portion 22 on the positive side in the X-axis (the position of the plate-portion fourth side 24d).

Figure 20:
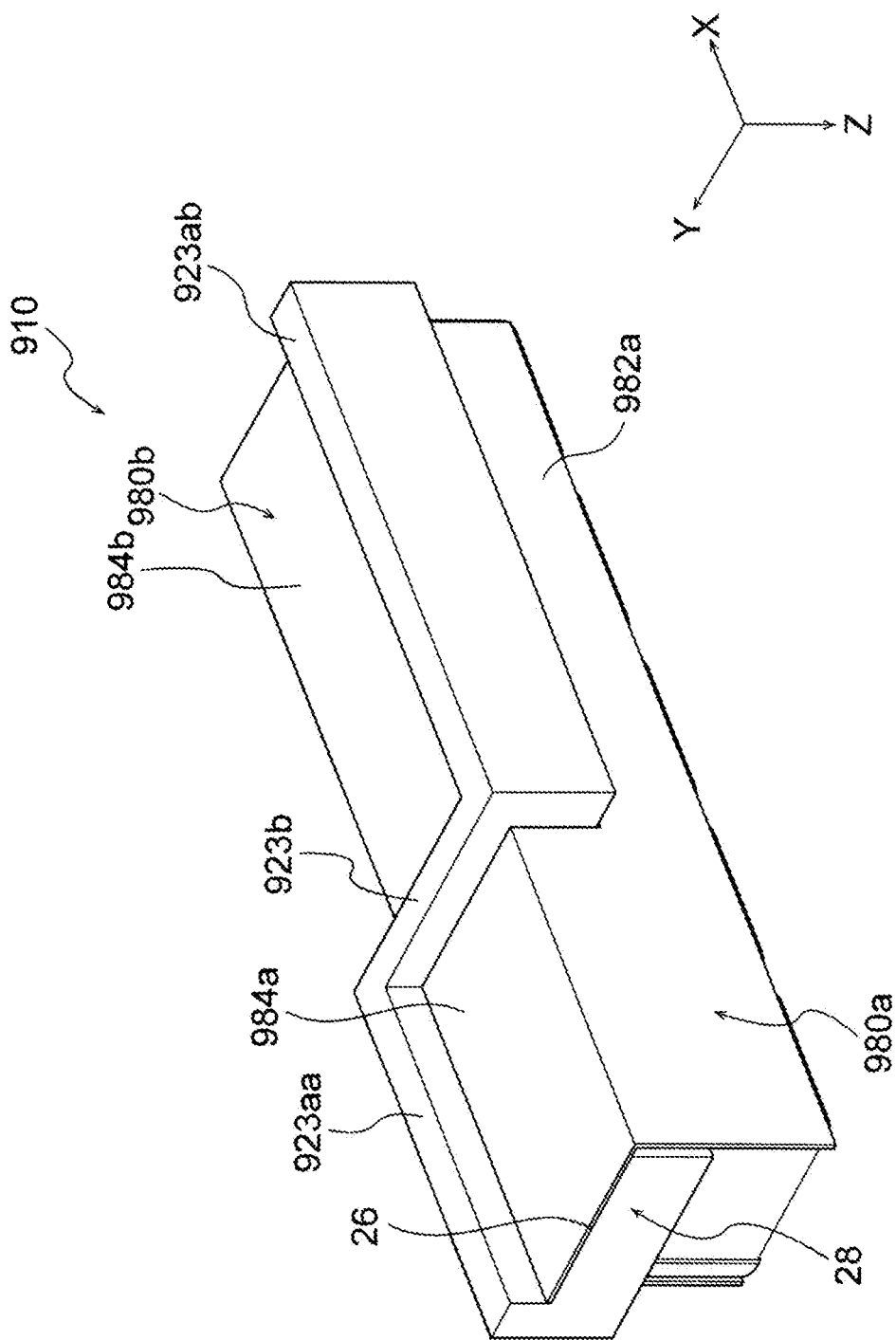
FIG. 20 is a schematic perspective view of the electronic device shown in FIG. 19 from diagonally above different from FIG. 19.

As shown in FIG. 19 and FIG. 20, the electronic device 910 includes a heat dissipation plate 980a and a heat dissipation plate 980b. As shown in FIG. 20, the heat dissipation plate 980a includes a top-surface heat dissipation portion 984a extending in the horizontal direction and a heat transmission portion 982a extending perpendicularly to the top-surface heat dissipation portion 984a. The heat transmission portion 982a is disposed so as to face the terminal electrodes 33 and 73 directed to the negative side in the Y-axis included in the plurality of chip components 30 and receives heat from the terminal electrodes 33 and 73 directed to the negative side in the Y-axis. The top-surface heat dissipation portion 984a is disposed on a part of the plate-portion top surface 26 of the plate portion 22 in the insulating case 920. As with the heat dissipation plate 580 according to Fourth Embodiment shown in FIG. 14, the heat transmission portion 982a and the terminal electrodes 33 and 73 directed to the negative side in the Y-axis are connected by, for example, solder at the time of mounting.

As shown in FIG. 19, similarly to the heat dissipation plate 980a, the heat dissipation plate 980b includes a top-surface heat dissipation portion 984b extending in the horizontal direction and a heat transmission portion 982b extending perpendicularly to the top-surface heat dissipation portion 984b. The heat transmission portion 982b is disposed so as to face the terminal electrodes 35 and 75 directed to the positive side in the Y-axis included in the plurality of chip components 30 and receives heat from the terminal electrodes 35 and 75 directed to the positive side in the Y-axis. The top-surface heat dissipation portion 984b is disposed on a part of the plate-portion top surface 26 of the plate portion 22 of the insulating case 920. As with the heat dissipation plate 580 according to Fourth Embodiment shown in FIG. 14, the heat transmission portion 982b and the terminal electrodes 35 and 75 directed to the positive side in the Y-axis are connected by, for example, solder at the time of mounting.

As shown in FIG. 19 and FIG. 20, the insulating case 920 includes upper protrusion portions 923aa, 923ab, and 923b protruding upward from the plate-portion top surface 26. The upper protrusion portion 923aa is formed along the plate-portion third side 24c as in the first protrusion portion 927a, and the upper protrusion portion 923ab is formed along the plate-portion first side 24a as in the first protrusion portion 927b. The upper protrusion portion 923b is disposed at a position overlapping with the third protrusion portion 929b in the X-axis direction and is formed so as to extend in the Y-axis direction.

The top-surface heat dissipation portion 984a is disposed on one side of the upper protrusion portion 923b extending in the Y-axis direction, and the top-surface heat dissipation portion 984b is disposed on the other side of the upper protrusion portion 923b. That is, the top-surface heat dissipation portion 984a and the top-surface heat dissipation portion 984b are separated by the upper protrusion portion 923b, and an insulating distance is secured.

When the electronic device 910 is assembled, the heat dissipation plates 980a and 980b can easily be positioned to the insulating case 920 by bringing the top-surface heat dissipation portions 984a and 984b into contact with the upper protrusion portions 923aa, 923ab, and 923b.

The electronic device 910 including the heat dissipation plates 980a and 980b can efficiently dissipate the heat generated in the plurality of chip components 30 from both of the terminal electrodes of the chip components 30 and more effectively prevent the temperature rise of the electronic device 910. The electronic device 910 according to Eighth Embodiment exhibits effects similar to those of the electronic device 510 according to Fourth Embodiment for the common matters with the electronic device 510.

Hereinabove, the electronic devices according to the present invention are described with reference to embodiments, but the technical scope of the present invention is not limited to only the embodiments and examples. Needless to say, the present invention includes many other embodiments, modification, and examples. For example, the insulating case 20 may include other protrusions other than the first protrusion portion 27 and the second protrusion portion 28. The shape of the plate portion 22 of the insulating case 20 is not limited to only the rectangular flat plate shape as shown in FIG. 3 and may be other polygonal shapes or a shape having a curved side.

Ninth Embodiment

Figure 22:
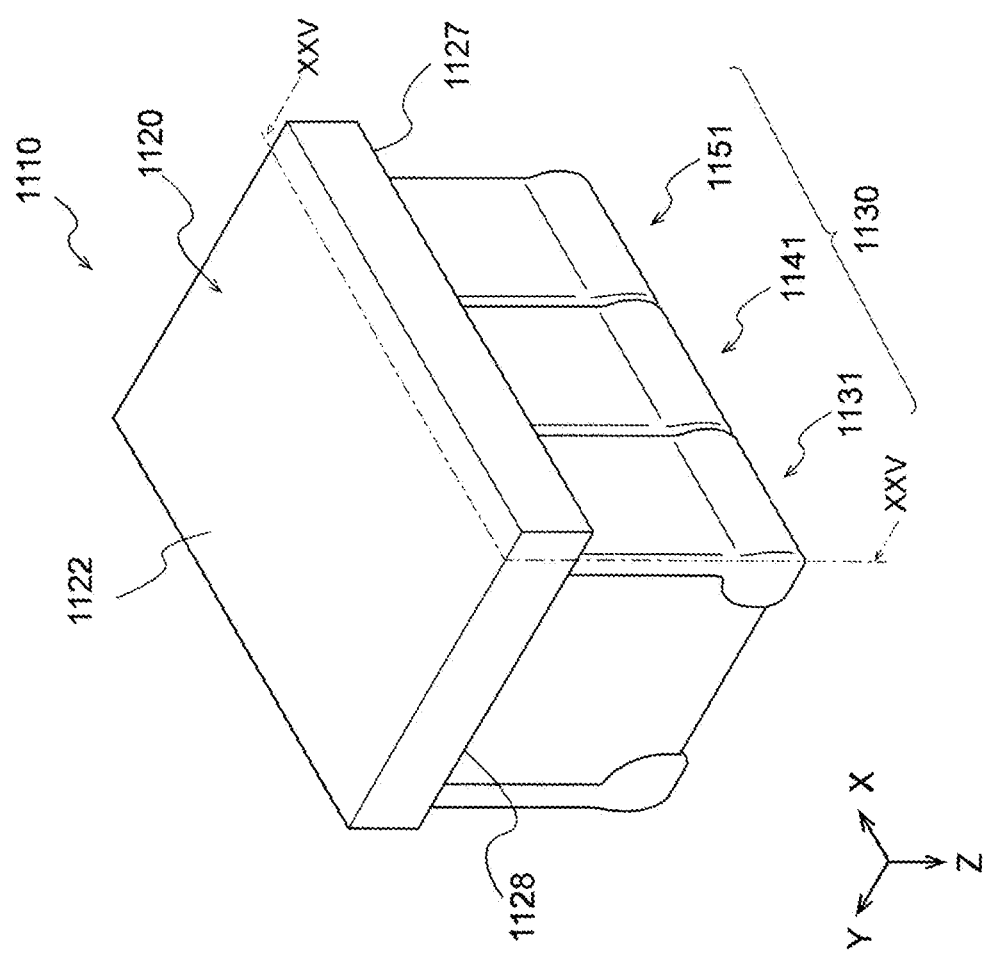
FIG. 22 is a schematic perspective view of an electronic device according to Ninth Embodiment of the present invention from diagonally above.

FIG. 22 is a schematic perspective view of an electronic device 1110 according to Ninth Embodiment of the present invention from diagonally above. In the electronic device 1110, the structure and shape of a plurality of chip components 1130 included in the electronic device 1110 are different from the plurality of chip components 30 included in the electronic devices according to First to Ninth Embodiments. The electronic device 1110 is also different from the electronic device 10 according to First Embodiment in terms of the number of plurality of chip components 1130 included in the electronic device 1110 and the size of an insulating case 1120. However, the electronic device 1110 is similar to the electronic device 10 according to First Embodiment in terms of a first protrusion portion 1127 and a second protrusion portion 1128 included in the insulating case 1120 and the arrangement state of the plurality of chip components 1130 to the insulating case 1120. The electronic device 1110 according to Ninth Embodiment is mainly explained for differences from the electronic device 10 according to First Embodiment, and common matters with the electronic device 10 are not explained.

As shown in FIG. 22, the electronic device 1110 includes a plurality of chip components 1130 and an insulating case 1120 for fixing the plurality of chip components 1130. The plurality of chip components 1130 of the electronic device 1110 consists of three chip components 1131, 1141, and 1151.

The number of chip components 1131, 1141, and 1151 included in the plurality of chip components 1130 is not limited to only three as shown in FIG. 22 and may be two or four or more. In the electronic device 1110, since the chip components 1131, 1141, and 1151 have substantially the same shape, size, and structure, the chip components 1131, 1141, and 1151 are mainly explained for the chip component 1131, and the other chip components 1141 and 1151 are not explained.

Figure 23:
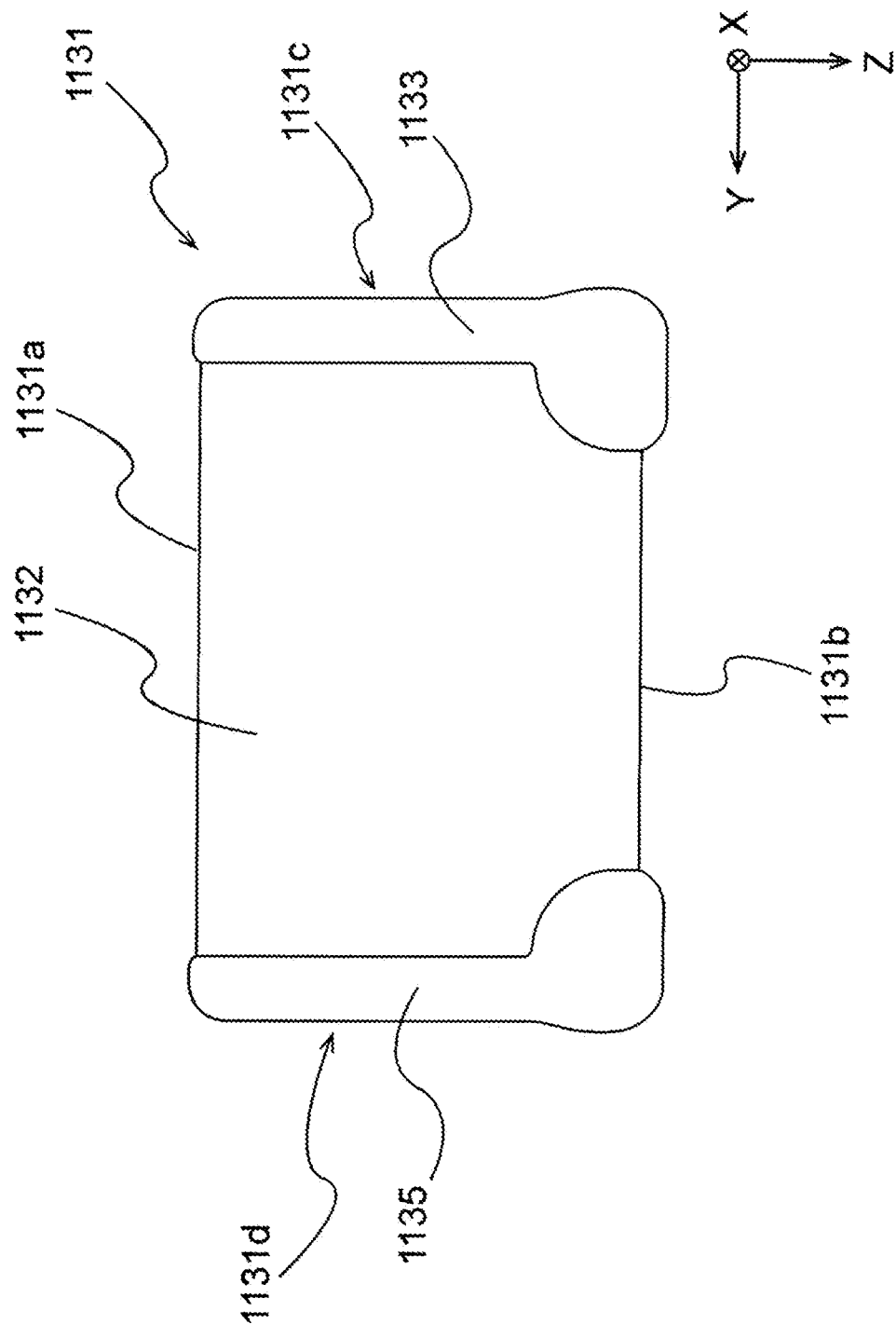
FIG. 23 is a side view of a chip component included in the electronic device shown in FIG. 22.

FIG. 23 is a side view of the chip component 1131 included in the electronic device 1110 shown in FIG. 22. As with the chip component 31 shown in FIG. 2, the chip component 1131 has a substantially rectangular parallelepiped outer shape and is disposed so that a first side surface 1131a directed upward (negative side in the Z-axis) faces a plate-portion bottom surface 1124 of a plate portion 1122 of the insulating case 1120 (see FIG. 25). The chip component 1131 is a chip capacitor, but may be a chip component other than chip capacitors, such as chip inductors and chip varistors.

As shown in FIG. 23, the chip component 1131 includes an element body 1132 and a pair of terminal electrodes 1133 and 1135. The terminal electrodes 1133 and 1135 are formed on the whole of a first end surface 1131c and a second end surface 1131d perpendicular to the Y-axis direction (second direction) of the chip component 1131. The terminal electrodes 1133 and 1135 also spreads to the other surfaces adjacent to the first end surface 1131c and the second end surface 1131d. That is, the terminal electrodes 1133 and 1135 are also partly arranged on the first side surface 1131a on the negative side in the Z-axis, a second side surface 1131b on the positive side in the Z-axis, a third side surface 1131e on the negative side in the X-axis, and a fourth side surface 1131f on the positive side in the X-axis (see FIG. 25). However, one terminal electrode 1133 of the pair of terminal electrodes 1133 and 1135 is disposed with a predetermined interval to the other terminal electrode 1135, and one terminal electrode 1133 and the other terminal electrode 1135 are insulated from each other.

Figure 24:
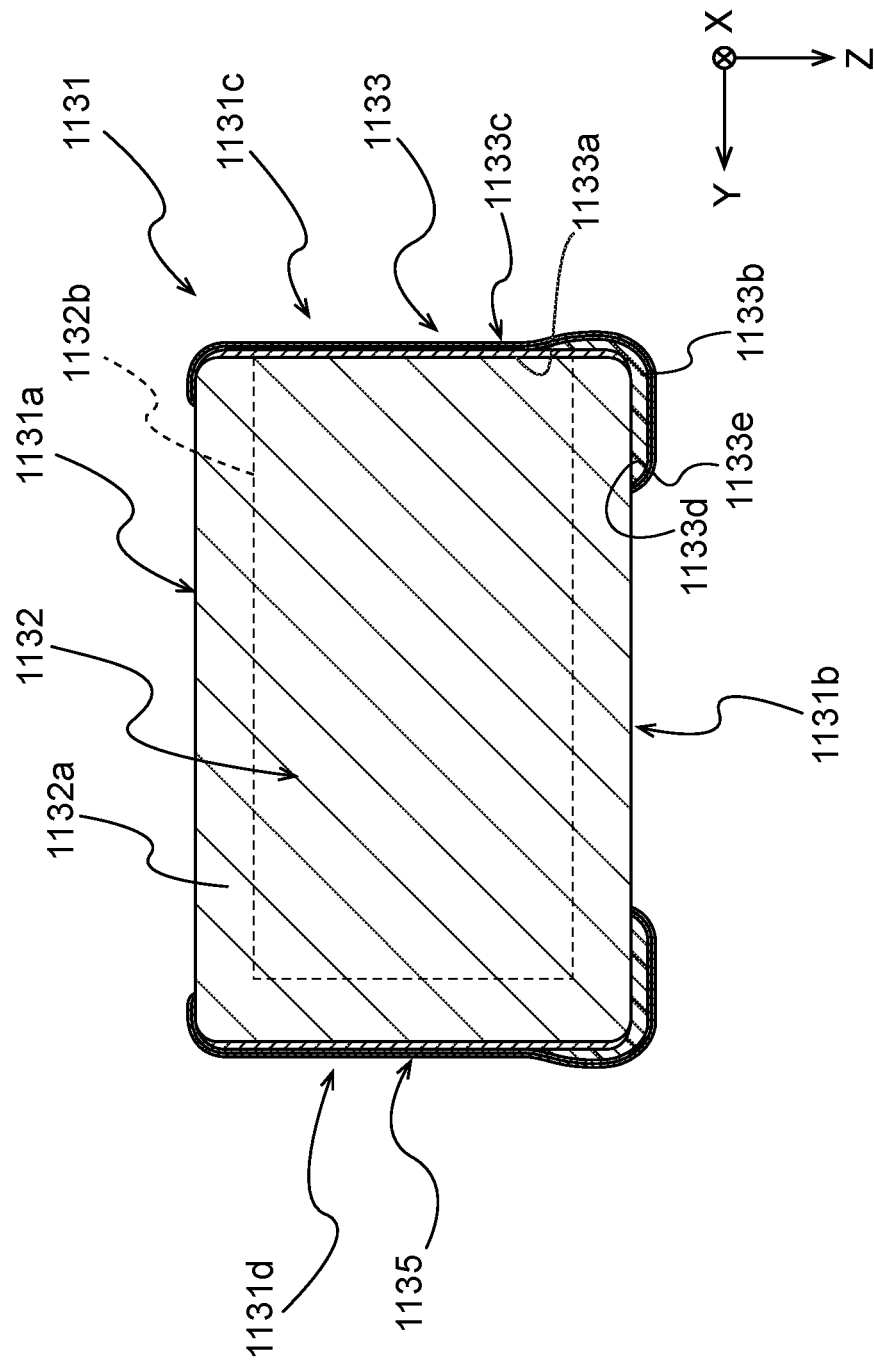
FIG. 24 is a cross-sectional view of a chip component included in the electronic device shown in FIG. 22.
Figure 25:
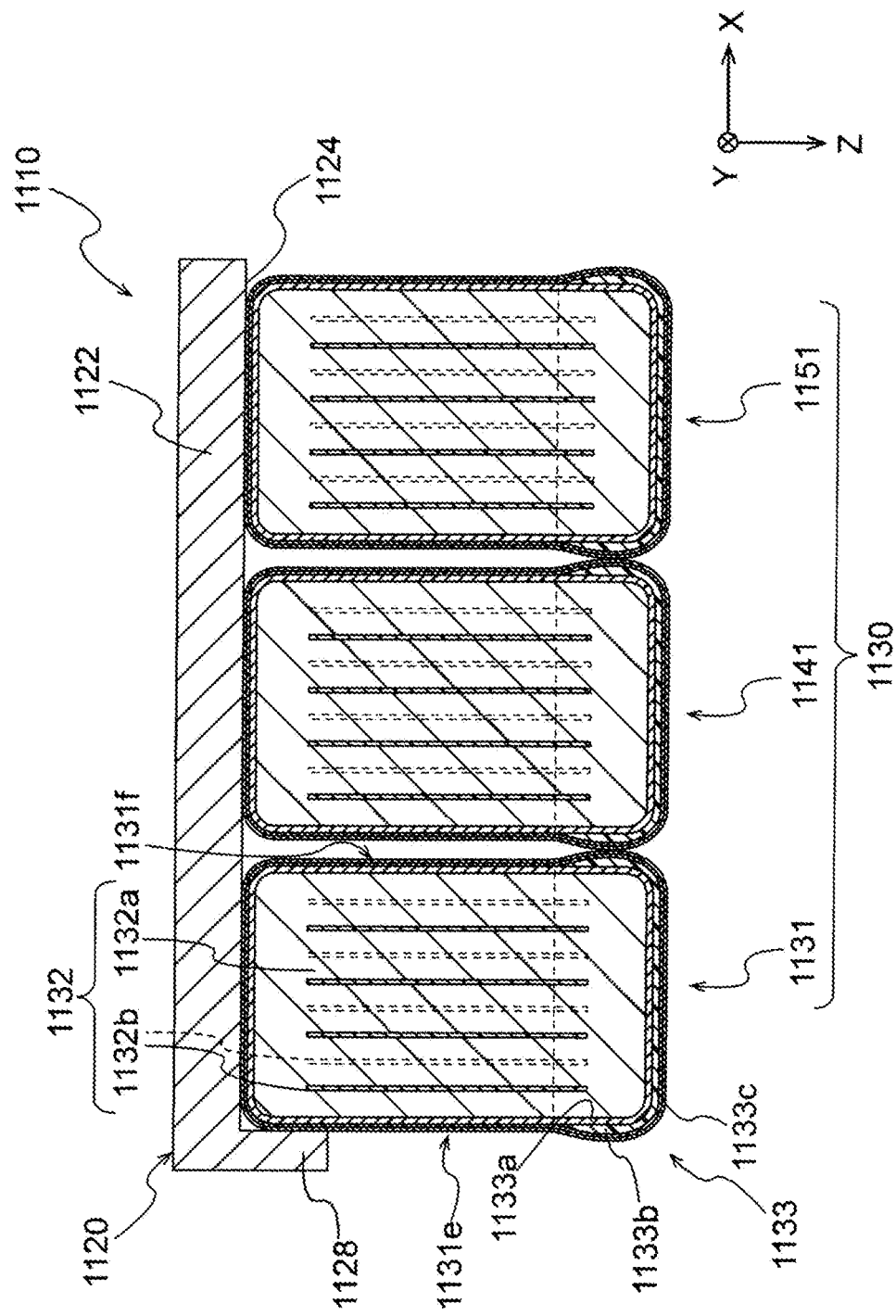
FIG. 25 is a schematic cross-sectional view of the electronic device shown in FIG. 22.

FIG. 24 is a schematic cross-sectional view of the chip component 1131 included in the electronic device 1110 shown in FIG. 22. The element body 1132 of the chip component 1131 includes dielectric layers 1132a and internal electrode layers 1132b. As shown in FIG. 25, which is a cross-sectional view of the electronic device 1110, the dielectric layers 1132a and the internal electrode layers 1132b are laminated alternately in the X-axis direction. The materials of the dielectric layers 1132a and the internal electrode layers 1132b of the chip component 1131 are similar to those of dielectric layers and internal electrode layers of the chip component 31.

The internal electrode layers 1132b laminated inside the chip component 1131 are divided into those connected to one terminal electrode 1133 and those connected to the other terminal electrode 1135. The potential difference applied to the terminal electrode 1133 and the terminal electrode 1135 is applied to the dielectric layers 1132a of the chip component 1131 via the internal electrode layers. As shown in FIG. 24 and FIG. 25, preferably, the internal electrode layers 1132b extend perpendicularly to the second side surface 1131b (Z-axis direction), which is a mounting surface, for the purpose of ESR reduction.

As shown in FIG. 24, one terminal electrode 1133 includes three sections of a first layer 1133a, a second layer 1133b, and a third layer 1133c. The first layer 1133a is the innermost layer (on the element body 1132 side). The inside of the first layer 1133a is contacted with only the element body 1132, and the outside of the first layer 1133a is contacted with the second layer 1133b and the third layer 1133c.

As shown in FIG. 24 and FIG. 25, the first layer 1133a is directly connected to the internal electrode layers 1132b. Preferably, the first layer 1133a cover the whole of the internal electrode layers 1132b exposed to the end surface of the element body 1132 on the negative side in the Y-axis. The entire outside of the first layer 1133a is directly or indirectly covered by the third layer 1133c, and the first layer 1133a is not exposed to the surface of the chip component 1131.

The first layer 1133a is made of a sintered metal layer of Cu, Ni, etc. For example, the first layer 1133a is formed by applying a conductive paste containing a base metal such as Cu and Ni to the end surfaces of the element body 1132 and firing the paste. The conductive paste contains metal powder made of Cu or Ni, glass component, organic binder, organic solvent, etc.

The second layer 1133b is at least partly disposed between the first layer 1133a and the third layer 1133c. The inside of the second layer 1133b is contacted with the element body 1132 or the first layer 1133a, and the outside of the second layer 1133b is contacted with the third layer 1133c.

As shown in FIG. 24 and FIG. 25, the second layer 1133b is formed so as to be positioned continuously to a part of each of four surfaces of the first end surface 1131c and the second side surface 1131b, the third side surface 1131e, and the fourth side surface 1131f adjacent to the first end surface 1131c of the chip component 1131. The second layer 1133b only partly covers a lower part of the first layer 1133a, and more than half of an upper part of the first layer 1133a (the negative side in the Z-axis) is not covered by the second layer 1133b.

As shown in FIG. 24, the second layer 1133b is disposed most on the second side surface 1131b (mounting surface of the chip component 1131) side and is disposed second most on the first end surface 1131c side.

The second layer 1133b is made of, for example, a conductive resin layer containing a resin (e.g., thermosetting resin) and a conductive material (e.g., metal powder). The second layer 1133b has an electrical conductivity lower than that of the first layer 1133a and the third layer 1133c and is preferably more easily deformable than the first layer 1133a and the third layer 1133c. The conductive material contained in the second layer 1133b is Ag powder, Cu powder, or the like. The resin contained in the second layer 1133b is phenol resin, acrylic resin, silicone resin, epoxy resin, polyimide resin, or the like. The second layer 1133b is formed by, for example, curing a fluid second-layer composition containing a resin, a conductive material, a solvent, etc. on the surfaces of the first layer 1133a and the element body 1132.

The third layer 1133c covers the first layer 1133a and the second layer 1133b. Only the third layer 1133c of one terminal electrode 1133 is exposed to the surface of the chip component 1131. The inside of the third layer 1133c is contacted with the first layer 1133a and the second layer 1133b, and the outside of the third layer 1133c is exposed to the surface of the chip component 1131.

As shown in FIG. 24 and FIG. 25, the third layer 1133c is formed so as to be positioned continuously on the whole of the first end surface 1131c of the chip component 1131 and a part of the first side surface 1131a, the second side surface 1131b, the third side surface 1131e, and the fourth side surface 1131f adjacent to the first end surface 1131c.

The third layer 1133c is made of, for example, a metal plating layer. As shown in FIG. 24 and FIG. 25, the third layer 1133c has a double-layer structure of a third inner layer 1133d and a third outer layer 1133e made of different materials. For example, the third inner layer 1133d is manufactured by forming a Ni plating layer on (outside) the first layer 1133a and the second layer 1133b. The third inner layer 1133d is not limited to the Ni plating layer and may be a Sn plating layer, a Cu plating layer, an Au plating layer, or the like.

For example, the third outer layer 1133e is manufactured by forming a Sn plating layer on (outside) the third inner layer 1133d. The third outer layer 1133e is not limited to the Sn plating layer and may be a Cu plating layer, an Au plating layer, or the like.

As shown in FIG. 22 and FIG. 24, the other terminal electrode 1135 has a shape substantially symmetrical to that of one terminal electrode 1133. The other terminal electrode 1135 is formed so as to be positioned continuously on the whole of the second end surface 1131d of the chip component 1131 and a part of the first side surface 1131a, the second side surface 1131b, the third side surface 1131e, and the fourth side surface 1131f adjacent to the first end surface 1131c. Since the other terminal electrode 1135 has structure and material similar to those of one terminal electrode 1133 except for the arrangement in the chip component 1131, the other terminal electrode 1135 is not explained in detail.

As shown in FIG. 22 and FIG. 24, the chip components 1131, 1141, and 1151 are arranged along the first protrusion portion 1127 of the insulating case 1120 and fixed to the plate-portion bottom surface 1124 of the insulating case 1120. The chip components 1131, 1141, and 1151 are arranged in the X-axis direction so as to contact with each other. Unlike this, the chip components 1131, 1141, and 1151 may be arranged with a gap between each other.

As shown in FIG. 22 and FIG. 24, the electronic device 1110 includes a plurality of chip components 1130 including the second layer 1133b, which is a conductive resin layer. In the electronic device 1110 including the plurality of chip components 1130, the second layer 1133b (conductive resin layer) reduces the stress transmitted to the element body 1132 via a mounting board or so, and it is possible to favorably prevent the problem of damage, such as cracking, occurring in the element body 1132. Thus, the electronic device 1110 including the plurality of chip components 1130 has a higher ability, particularly in terms of moisture resistance reliability.

In the terminal electrodes 1133 and 1135 of the electronic device 1110, as shown in FIG. 24, the second layer 1133*b* (conductive resin layer) does not entirely cover the first layer 1133*a*, and the first layer 1133*a* and the third layer 1133*c* are contacted directly. Compared to conventional terminal electrodes with only conductive resin and terminal electrodes in which a conductive resin layer covers a lower electrode layer, the terminal electrodes 1133 and 1135 can reduce values of resistance component such as ESR.

In the electronic device 1110, as shown in FIG. 24, the second layer 1133*b* (conductive resin layer) is not disposed on the first side surface 1131*a* side of the plurality of chip components 1130. Thus, the second layer 1133*b* does not prevent heat conduction from the plurality of chip components 1130 to the insulating case 1120, and the electronic device 1110 can thereby prevent deterioration of heat dissipation by using the conductive resin layer.

The electronic device 1110 exhibits effects similar to those of the electronic device 10 according to First Embodiment for the common matters with the electronic device 10.

DESCRIPTION OF THE REFERENCE NUMERICAL

1, 310, 410, 510, 610, 710, 810, 910, 1110 . . . electronic device
12 . . . adhesive cured portion
20, 120, 220, 320, 420, 520, 720, 920, 1120 . . . insulating case
22, 122, 222, 722, 1122 . . . plate portion
24, 124, 224, 724, 1124 . . . plate-portion bottom surface
24*a*, 724*a* . . . plate-portion first side
24*b*, 724*b* . . . plate-portion second side
24*c* . . . plate-portion third side
24*ca*, 24*da* . . . non-protrusion edge portion
24*d* . . . plate-portion fourth side
26 . . . plate-portion top surface
27, 727, 1127 . . . first protrusion portion
28, 728, 1128 . . . second protrusion portion
729 . . . fourth protrusion portion
30, 730*a*, 730*b*, 830, 1130 . . . plurality of chip components
31, 41, 51, 61, 71, 831, 841, 851, 861, 871, 131, 1141, 1151 . . . chip component
31*a*, 1131*a* . . . first side surface
31*b*, 1131*b* . . . second side surface
31*e*, 1131*e* . . . third side surface
1131*f* . . . fourth side surface
31*c*, 1131*c* . . . first end surface
31*d*, 1131*d* . . . second end surface
33, 35, 73, 75, 1133, 1135 . . . terminal electrode
1133*a* . . . first layer
1133*b* . . . second layer
1133*c* . . . third layer
1133*d* . . . third inner layer
1133*e* . . . third outer layer
1135 . . . the other terminal electrode
1131*a* . . . first side surface
1131*b* . . . second side surface
1131*e* . . . third side surface
1131*c* . . . first end surface
90 . . . virtual plane
95 . . . mounting board
96 . . . land pattern
97 . . . solder fillet h1, h2, h3 . . . protrusion length
123 . . . recess
223 . . . groove
329*a*, 329*b*, 429*a*, 429*b*, 429*c*, 429*d*, 929*a*, 929*b*, 929*c*, 929*d* . . . third protrusion portion
523*a*, 523*b*, 923*aa*, 923*ab*, 923*b* . . . upper protrusion portion
580, 680, 980*a*, 980*b* . . . heat dissipation plate
582, 682, 982*a*, 982*b* . . . heat transmission portion
584, 684, 984*aa*, 984*ab*, 984*b* . . . top-surface heat dissipation portion 584*a* . . . notch
686 . . . cylindrical heat dissipation portion

What is claimed is:

1. An electronic device comprising:
   a plurality of chip components arranged in a first direction; and
   an insulating case including:
   a plate portion facing first side surfaces of the plurality of chip components;
   a first protrusion portion formed along a plate-portion first side of the plate portion parallel to the first direction and protruding from the plate portion to a chip components side along a third direction perpendicular to the first direction; and
   a second protrusion portion formed to the first protrusion portion in a second direction perpendicular to the first direction and the third direction and protruding from the plate portion, to the chip components side along the third direction,
   wherein a protrusion length of the first protrusion portion and the second protrusion portion from the plate portion in the third direction is ½ or less of a protrusion length of the chip component included in the plurality of chip components from the plate portion in the third direction.

2. The electronic device according to claim 1, wherein terminal electrodes of at least two chip components included in the plurality of chip components are contacted with each other.

3. The electronic device according to claim 1, wherein second side surfaces of the plurality of chip components directed opposite to the first side surfaces are arranged along a virtual plane substantially parallel to the plate portion, and
terminal electrodes included in the plurality of chip components are at least partly formed on the second side surfaces.

4. The electronic device according to claim 1, further comprising a heat dissipation plate including a heat transmission portion disposed so as to face terminal electrodes included in the plurality of chip components and configured to transmit heat from the plurality of chip components and having a thermal conductivity higher than that of the insulating case.

5. The electronic device according to claim 4, wherein the heat dissipation plate includes a plate heat dissipation portion disposed on one side surface of the plate portion directed opposite to the other side surface of the plate portion facing the chip components in the plate portion.

6. The electronic device according to claim 5, wherein the heat dissipation plate is adhered to the one side surface of the plate portion, and
the first side surfaces of the plurality of chip components are adhered to the other side surface of the plate portion.

7. The electronic device according to claim 4, wherein
the plate portion has a substantially rectangular shape when viewed from the chip components side in the third direction,
the chip component included in the plurality of chip components includes a pair of terminal electrodes, and
the heat dissipation plate of the heat transmission portion faces the terminal electrode closer to a plate-portion third side parallel to the plate-portion first side than the plate-portion first side among the pair of terminal electrodes.

8. The electronic device according to claim 4, wherein the heat dissipation plate includes a cylindrical heat dissipation portion formed in the first direction.

9. The electronic device according to claim 1, wherein
the plate portion has a substantially rectangular shape when viewed from the chip components side in the third direction,
the second protrusion portion is disposed along a plate-portion second side perpendicular to the plate-portion first side of the plate portion, and
non-protrusion edge portions with no protrusion are formed on a plate-portion third side parallel to the plate-portion first side and a plate-portion fourth side parallel to the plate-portion second side in the plate portion.

10. The electronic device according to claim 1, wherein
the plate portion has a substantially rectangular shape when viewed from the chip components side in the third direction, and
the plurality of chip components partly protrudes outside the plate portion from a plate-portion third side parallel to the plate-portion first side of the plate portion.

11. The electronic device according to claim 1, wherein the insulating case is made of resin.

12. The electronic device according to claim 1, wherein terminal electrodes of at least one chip component included in the plurality of chip components and at least another adjacent chip component are separated from each other.

13. The electronic device according to claim 1, wherein a recess or a groove is formed on a surface of the plate portion facing the chip components.

14. The electronic device according to claim 1, wherein
all of the chip components included in the plurality of chip components are contacted with the first protrusion portion, and
only one chip component located at one end in the first direction among the chip components included in the plurality of chip components is contacted with the second protrusion portion.

15. The electronic device according to claim 1, wherein
the second protrusion portion is formed along a plate-portion second side perpendicular to the plate-portion first side of the plate portion, and
the first protrusion portion and the second protrusion portion are connected substantially perpendicularly to form an L-shaped protrusion.

16. The electronic device according to claim 1, wherein a terminal electrode of the chip component includes:
a first layer connected to an internal electrode layer of an element body of the chip component;
a second layer covering a part of the first layer and continuing from a contact portion with the first layer to a portion located on a mounting surface side of the chip component; and
a third layer contacted with another part of the first layer and covering the first layer and the second layer,
the first layer and the third layer are made of a sintered metal layer or a metal plating layer, and
the second layer is made of a conductive resin layer.

17. An electronic device comprising:
a plurality of chip components arranged in a first direction; and
an insulating case including:
a plate portion facing first side surfaces of the plurality of chip components;
a first protrusion portion formed along a plate-portion first side of the plate portion parallel to the first direction and protruding from the plate portion to a chip components side along a third direction perpendicular to the first direction; and
a second protrusion portion formed to the first protrusion portion in a second direction perpendicular to the first direction and the third direction and protruding from the plate portion to the chip components side along the third direction,
wherein a protrusion length of the first protrusion portion and the second protrusion portion from the plate portion in the third direction is smaller than a protrusion length of the chip component included in the plurality of chip components from the plate portion in the third direction, and
the electronic device further comprises a heat dissipation plate including a heat transmission portion disposed so as to face terminal electrodes included in the plurality of chip components and configured to transmit heat from the plurality of chip components and having a thermal conductivity higher than that of the insulating case.

18. The electronic device according to claim 17, wherein a recess or a groove is formed on a surface of the plate portion facing the chip components.

19. An electronic device comprising:
a plurality of chip components arranged in a first direction; and
an insulating case including:
a plate portion facing first side surfaces of the plurality of chip components;
a first protrusion portion formed along a plate-portion first side of the plate portion parallel to the first direction and protruding from the plate portion to a chip components side along a third direction perpendicular to the first direction; and
a second protrusion portion formed to the first protrusion portion in a second direction perpendicular to the first direction and the third direction and protruding from the plate portion to the chip components side along the third direction,
wherein a protrusion length of the first protrusion portion and the second protrusion portion from the plate portion in the third direction is smaller than a protrusion length of the chip component included in the plurality of chip components from the plate portion in the third direction,
wherein the plate portion has a substantially rectangular shape when viewed from the chip components side in the third direction,
wherein the second protrusion portion is disposed along a plate-portion second side perpendicular to the plate-portion first side of the plate portion, and wherein non-protrusion edge portions with no protrusion are formed on a plate-portion third side parallel to the plate-portion first side and a plate-portion fourth side parallel to the plate-portion second side in the plate portion.

20. The electronic device according to claim 19, wherein a recess or a groove is formed on a surface of the plate portion facing the chip components.

21. An electronic device comprising:
a plurality of chip components arranged in a first direction; and
an insulating case including:
  a plate portion facing first side surfaces of the plurality of chip components;
  a first protrusion portion formed along a plate-portion first side of the plate portion parallel to the first direction and protruding from the plate portion to a chip components side along a third direction perpendicular to the first direction; and
  a second protrusion portion formed to the first protrusion portion in a second direction perpendicular to the first direction and the third direction and protruding from the plate portion to the chip components side along the third direction,
wherein a protrusion length of the first protrusion portion and the second protrusion portion from the plate portion in the third direction is smaller than a protrusion length of the chip component included in the plurality of chip components from the plate portion in the third direction,
wherein the plate portion has a substantially rectangular shape when viewed from the chip components side in the third direction, and
wherein the plurality of chip components partly protrudes outside the plate portion from a plate-portion third side parallel to the plate-portion first side of the plate portion.

22. The electronic device according to claim 21, wherein a recess or a groove is formed on a surface of the plate portion facing the chip components.

* * * * *